US010778860B2

(12) United States Patent
Watanabe et al.

(10) Patent No.: US 10,778,860 B2
(45) Date of Patent: Sep. 15, 2020

(54) POWER SUPPLY DEVICE CONFIGURED TO AUTOMATICALLY RESTORE POWER AFTER RECOVERY FROM A POWER FAILURE, IMAGE FORMING APPARATUS, AND CONTROL METHOD

(71) Applicants: Kenichi Watanabe, Kanagawa (JP); Tomohiro Shuta, Kanagawa (JP); Yuuya Mori, Shiga (JP)

(72) Inventors: Kenichi Watanabe, Kanagawa (JP); Tomohiro Shuta, Kanagawa (JP); Yuuya Mori, Shiga (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/299,707

(22) Filed: Mar. 12, 2019

(65) Prior Publication Data

US 2019/0289156 A1  Sep. 19, 2019

(30) Foreign Application Priority Data

Mar. 14, 2018  (JP) .................. 2018-046230

(51) Int. Cl.
*H04N 1/00* (2006.01)
*G06F 1/26* (2006.01)

(52) U.S. Cl.
CPC ......... *H04N 1/00901* (2013.01); *G06F 1/263* (2013.01); *H04N 1/00891* (2013.01)

(58) Field of Classification Search
None
See application file for complete search history.

(56) References Cited

U.S. PATENT DOCUMENTS

| 5,832,281 A | 11/1998 | Maeda |
| 9,442,547 B2 | 9/2016 | Sunagawa |
| 2013/0262886 A1* | 10/2013 | Nishimura ................ G06F 1/26 713/300 |

FOREIGN PATENT DOCUMENTS

| GB | 2315618 A * | 2/1998 | .............. H02J 9/005 |
| JP | H08-171436 | 7/1996 | |
| JP | 2014-123345 | 7/2014 | |

* cited by examiner

*Primary Examiner* — Thomas D Lee
(74) *Attorney, Agent, or Firm* — Harness, Dickey and Pierce, P.L.C.

(57) ABSTRACT

A power supply device installed in an electronic apparatus includes a first power supply outputting power upon a plug being connected to a system power supply, a second power supply outputting power upon receiving of a power supply control signal, a third power supply outputting power from a battery, a controller operating using the power from the second power supply and configured to control the electronic apparatus, a flip-flop configured to operate using the power from the third power supply and configured to store, upon activating the electronic apparatus, first logic data or upon shutting down the electronic apparatus, second logic data, and a power supply control switch operating using the power from the first power supply, to output the power supply control signal to the second power supply, in response to activating the electronic apparatus or in response to storing the first logic data in the flip-flop.

16 Claims, 13 Drawing Sheets

POWER SUPPLY DEVICE CONFIGURED TO AUTOMATICALLY RESTORE POWER AFTER RECOVERY FROM A POWER FAILURE, IMAGE FORMING APPARATUS, AND CONTROL METHOD

CROSS-REFERENCE TO RELATED APPLICATIONS

The present application is based on and claims priority to Japanese Patent Application No. 2018-046230, filed on Mar. 14, 2018, the contents of which are incorporated herein by reference in their entirety.

BACKGROUND OF THE INVENTION

1. Field of the Invention

The disclosures discussed herein relate to a power supply device, an image forming apparatus, and a control method.

2. Description of the Related Art

In a case where an image forming apparatus has been turned off due to a power failure of the system power supply, it is desirable that a power supply of the image forming apparatus automatically turns on upon restoration of the system power supply from the power failure. There is a technology known in the art where an image forming apparatus is provided with a microcomputer for determining whether power supply has been turned off due to a power failure of the system power supply or power supply has been turned off turned off by operation of a user. When the power supply of an image forming apparatus is turned off due to a power failure of the system power supply, the microcomputer automatically turns on the image forming apparatus upon the system power supply being restored from the power failure.

For example, Patent Document 1 discloses an apparatus provided with a microcomputer for automatically turning on power supply of the apparatus upon restoration from power failure of the system power supply in a case where the apparatus is powered off due to a power failure of the system power supply.

However, in the apparatus provided with such a microcomputer, there appears to be an increase in hardware cost due to installation of the microcomputer, an increase in development person-hours for software coding of the microcomputer, and an increase in power consumption during plug-in by the microcomputer. In addition, such a microcomputer is responsible for determining whether the power supply has been turned off due to power failure of the system power supply or the power supply has been turned off by a user's operation, and executing a process of changing an activation method based on the determination; hence, there appears to be an increase in an activation time due to the processing time of the microcomputer.

RELATED-ART DOCUMENT

Patent Document

Patent Document 1: Japanese Unexamined Patent Publication No. 2014-123345

SUMMARY OF THE INVENTION

An aspect of the present invention is directed to providing a technology capable of reducing hardware cost, reducing development person-hours, reducing plug-in power consumption, and reducing activation time.

According to at least one embodiment, a power supply device installed in an electronic apparatus is provided. The power supply device includes a first power supply configured to output electric power upon a plug being connected to a system power supply;

a second power supply configured to output electric power upon receiving of a power supply control signal;

a third power supply configured to output electric power from a battery;

a controller configured to operate using the electric power output from the second power supply to control the electronic apparatus;

a flip-flop configured to operate using the electric power output from the third power supply and configured to store first logic data indicating that an operation for activating the electronic apparatus has been performed or second logic data indicating that an operation for shutting down the electronic apparatus has been performed; and a power supply control switch configured to operate using the electric power output from the first power supply, and to output the power supply control signal to the second power supply, in response to the operation for activating the electronic apparatus being performed or in response to the flip-flop storing the first logic data. In the power supply device, the controller causes, upon the operation for activating the electronic apparatus being performed, the flip-flop to store the first logic data, and the controller causes, upon the operation for shutting down the electronic apparatus being performed, the flip-flop to store the second logic data.

Other objects, features and advantages of the present invention will become more apparent from the following detailed description when read in conjunction with the accompanying drawings.

DETAILED DESCRIPTION OF THE PREFERRED EMBODIMENTS

The following illustrates, with reference to the accompanying drawings, preferred embodiments of a power supply device, an image forming apparatus, and a control method.

In order to facilitate understanding of the following embodiments, first and second comparative examples will be described prior to the description of the embodiments.

First Comparative Example

Figure 1:
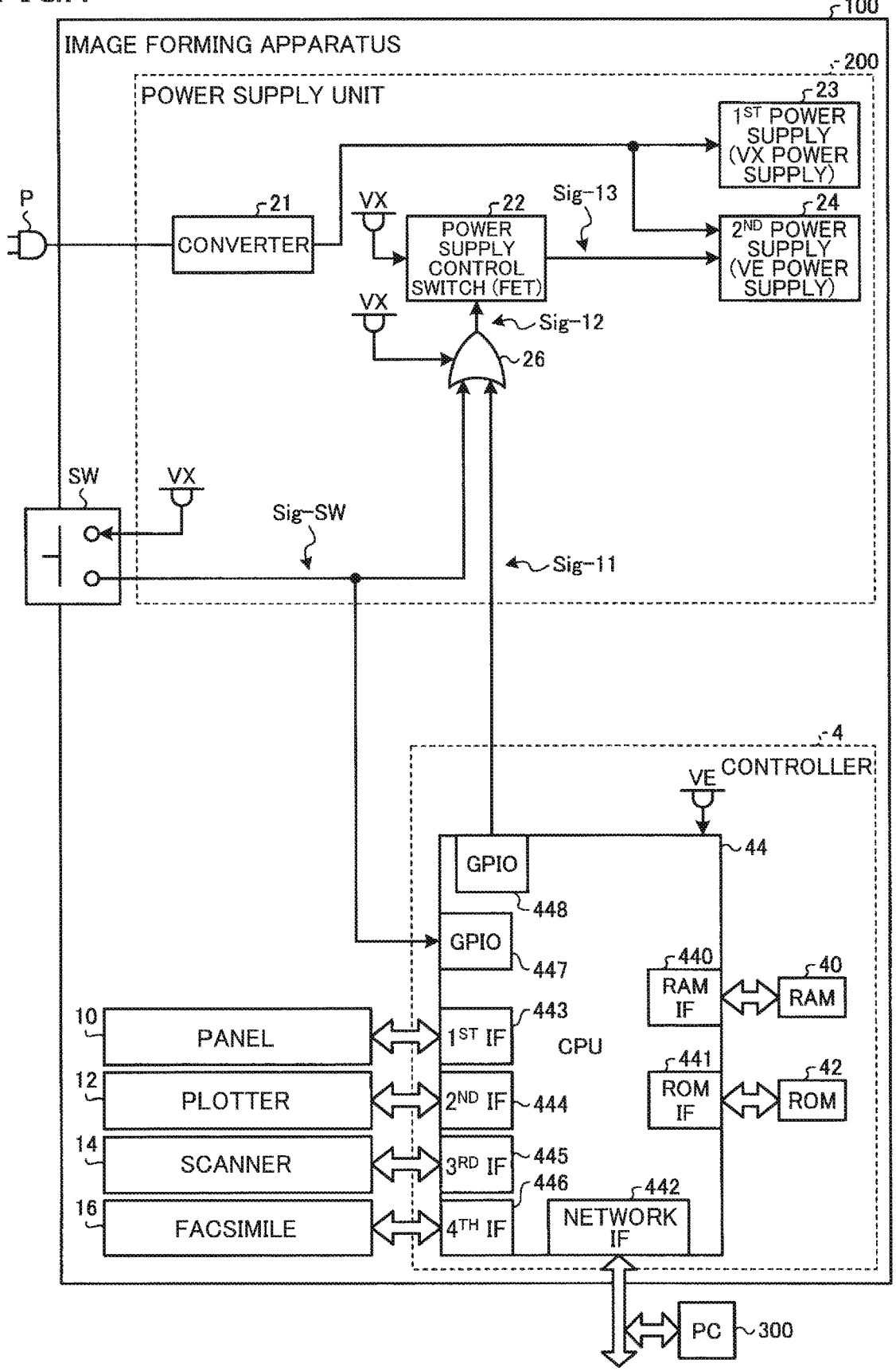
FIG. 1 is a block diagram illustrating a configuration of an image forming apparatus of a first comparative example.

FIG. 1 is a block diagram illustrating a configuration of an image forming apparatus of a first comparative example. An image forming apparatus 100, which is an electronic apparatus, includes a controller 4, a panel 10, a plotter 12, a scanner 14, a facsimile 16, a power supply unit 200 as a power supply device, and a push switch SW.

The panel 10 displays information relating to the image forming apparatus 100. The plotter 12 outputs an image formed by the image forming apparatus 100 onto a sheet of paper or the like. The scanner 14 reads an image. The facsimile 16 communicates with an external apparatus by facsimile. That is, the panel 10, the plotter 12, the scanner 14, and the facsimile 16 are processing units that perform respective processes.

The controller 4 includes a RAM 40, a ROM 42, and a CPU 44. The CPU 44 is an integrated circuit including a RAM interface (IF) 440, a ROM interface 441, a network interface 442, a first interface 443, a second interface 444, a third interface 445, a fourth interface 446, and GPIO (General Purpose Input/Output) 447 and 448.

The network interface 442 is a communication unit that communicates with an external PC (Personal Computer) 300 or the like via a network. The first interface 443 is a panel interface for communicating with the panel 10. The second interface 444 is a plotter interface for communicating with the plotter 12. The third interface 445 is a scanner interface for communicating with the scanner 14. The fourth interface 446 is a facsimile interface for communicating with the facsimile 16. The GPIO 447 is an interface for receiving a signal Sig-SW from the push switch SW.

The power supply unit 200 includes a converter 21, a power supply control switch 22, a first power supply (VX power supply) 23, a second power supply (VE power supply) 24, and a two-input one-output OR circuit (OR gate circuit) 26. The power supply control switch 22 is exemplified by an FET (Field Effect Transistor); however, the power supply control switch 22 is not limited to the example of FET.

When a plug P is connected to the system power supply, the converter 21 converts alternating current (AC) power supplied from the system power supply into direct current (DC) power, and outputs the DC power to the first power supply 23 and to the second power supply 24.

When DC power is output from the converter 21, the first power supply 23 outputs a first DC voltage VX to the push switch SW, the power supply control switch 22, and the OR circuit 26. That is, when the plug P is connected to the system power supply, the first power supply 23 outputs the first voltage VX.

One terminal of the push switch SW is connected to the first power supply 23, and receives the first voltage VX. The other terminal of the push switch SW is connected to a first input terminal of the OR circuit 26. When a user presses the push switch SW, the push switch SW outputs a high level signal Sig-SW to the first input terminal of the OR circuit 26.

The OR circuit 26 is connected to the first power supply 23 and receives the first voltage VX, and thereby operates using electric power output from the first power supply 23. Upon receiving of the high level signal Sig-SW, the OR circuit 26 outputs a high level signal Sig-12 to the power supply control switch 22.

The power supply control switch 22 is connected to the first power supply 23 and receives the first voltage VX, and thereby operates using electric power output from the first power supply 23. As an example of the power supply control switch 22, a FET may be given. The FET includes a drain to receive the first voltage VX, a gate to receive the signal Sig-12, and a source to output a signal Sig-13, which is a power supply control signal, to the second power supply 24.

Upon receiving of the high level signal Sig-12, the power supply control switch 22 outputs a high level signal Sig-13 to the second power supply 24. Upon receiving of the high level signal Sig-13 from the power supply control switch 22, the second power supply 24 outputs a second direct current voltage VE to the controller 4, the panel 10, the plotter 12, the scanner 14, and the facsimile 16. The controller 4, the panel 10, the plotter 12, the scanner 14, and the facsimile 16 are activated (powered on) and operated by using electric power output from the second power supply 24. The second voltage VE may be the same as or different from the first voltage VX.

The CPU 44 is connected to the second power supply 24 and receives the second voltage VE, and is thus activated upon receiving of electric power output from the second power supply 24. Upon activation, the CPU 44 outputs a high level signal Sig-11, which is a power-hold signal, from a GPIO 448 to a second input terminal of the OR circuit 26. As a result, when a user stops pressing the push switch SW, the signal Sig-12 output from the OR circuit 26 is maintained at a high level, and the signal Sig-13 output from the power supply control switch 22 is also maintained at a high level. Thus, the second power supply 24 maintains the output of the second voltage VE.

The following considers a case where a power failure occurs in the system power supply when the image forming apparatus 100 is activated. When a power failure occurs in the system power supply while the image forming apparatus 100 is being activated, the first power supply 23 is powered off, and the output of the first voltage VX is stopped. When the output of the first voltage VX stops, the OR circuit 26 and the power supply control switch 22 are powered off, and the signal Sig-13 becomes a low level. As a result, the second power supply 24 is powered off, and the output of the second voltage VE is stopped. When the output of the second voltage VE stops, the CPU 44 is stopped (powered off), and the signal Sig-11, which is a power-hold signal, becomes a low level.

Thereafter, the power failure of the system power supply is restored, and the first power supply 23 starts outputting the first voltage VX. However, although the first power supply 23 starts outputting the first voltage VX, the signals Sig-12 and Sig-13 do not become high level unless a user presses the push switch SW. Thus, since the second power supply 24 does not start outputting the second voltage VE, the image forming apparatus 100 does not start up.

That is, even when the power failure of the system power supply is restored, the image forming apparatus 100 will not start unless the user presses the push switch SW.

As a result, for example, the image forming apparatus 100 is unable to receive a facsimile an arrival time of which is unknown. As a result, a user may fail to receive a business facsimile, resulting in concern of losing an opportunity with respect to an order and the like.

Second Comparative Example

Figure 2:
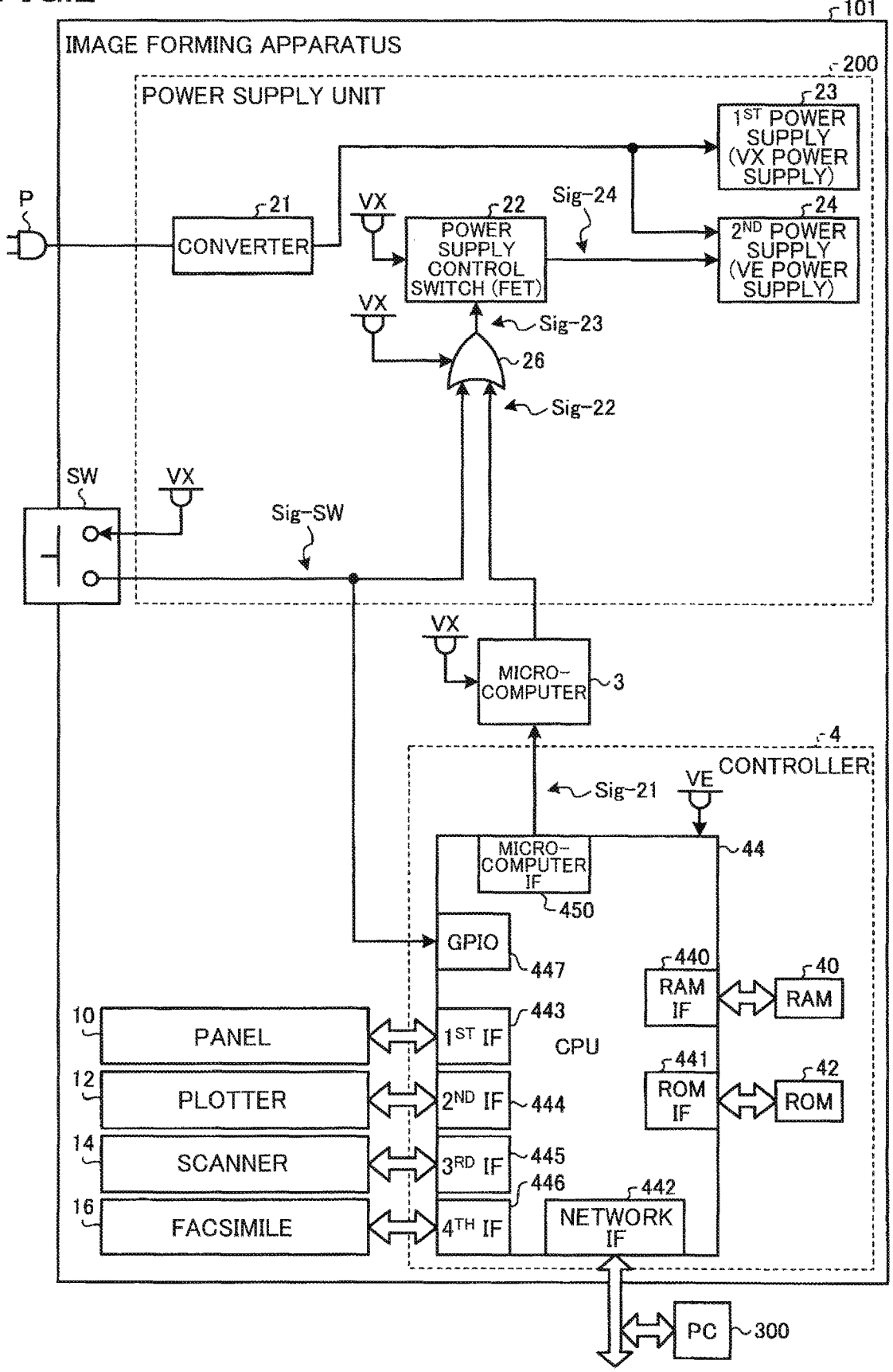
FIG. 2 is a block diagram illustrating a configuration of an image forming apparatus of a second comparative example.

FIG. 2 is a block diagram illustrating a configuration of an image forming apparatus of a second comparative example. Components that are the same as those of the first comparative example are denoted by the same reference numerals, and description of those components is omitted.

An image forming apparatus 101, which is an electronic apparatus, includes a microcomputer 3. The microcomputer 3 is connected to the first power supply 23, receives the first voltage VX, and starts up and operates using electric power output from the first power supply 23.

The CPU 44 is connected to the second power supply 24 and receives the second voltage VE, and is thus activated (power on) when receiving of and of electric power output from the second power supply 24. Upon activation, the CPU 44 outputs a high level signal Sig-21 from a microcomputer interface 450 to the microcomputer 3. The microcomputer 3 incorporates a rewritable ROM, and stores the high level signal Sig-21 in the ROM as a high level flag.

The microcomputer 3 monitors the flag stored in the ROM, and outputs, when the flag is on (indicates a high level), a high level signal Sig-22 to the second input terminal of the OR circuit 26. As a result, when a user stops pressing the push switch SW, a signal Sig-23 output from the OR circuit 26 is maintained at a high level and a signal Sig-24 output from the power supply control switch 22 is also maintained at a high level. Thus, the second power supply 24 maintains the output of the second voltage VE.

The following illustrates a case where the push switch SW is pressed by a user in order to shut down the image forming apparatus 101 when the image forming apparatus 101 is activated. When a user presses the push switch SW, the push switch SW outputs a high level signal Sig-SW to a GPIO 447. Upon receiving of the high level signal Sig-SW via the GPIO 447, the CPU 44 outputs a low level signal Sig-21 to the microcomputer 3. The microcomputer 3 stores the low level signal Sig-21 in the ROM as a low level flag.

The microcomputer 3 monitors the flag stored in the ROM, and outputs, when the flag is off (indicates a low level), a low level signal Sig-22 to the second input terminal of the OR circuit 26. As a result, when a user stops pressing the push switch SW, the signal Sig-23 output from the OR circuit 26 becomes a low level, and the signal Sig-24 output from the power supply control switch 22 also becomes a low level. As a result, the second power supply 24 is powered off, and the output of the second voltage VE is stopped. When the output of the second voltage VE stops, the CPU 44 is stopped (powered off), and the image forming apparatus 101 shuts down.

Next, the following illustrates a case where a power failure occurs in the system power supply when the image forming apparatus 101 is activated. When the image forming apparatus 101 is activated, a high level flag is stored in the ROM in the microcomputer 3. When a power failure occurs in the system power supply while the image forming apparatus 101 is being activated, the first power supply 23 is powered off, and the output of the first voltage VX is stopped. When the output of the first voltage VX stops, the OR circuit 26 and the power supply control switch 22 are powered off, and the signal Sig-24 becomes a low level. As a result, the second power supply 24 is powered off, and the output of the second voltage VE is stopped. When the output of the second voltage VE stops, the CPU 44 stops.

However, even if the output of the first voltage VX stops, the high level flag is continuously stored in the ROM in the microcomputer 3.

The following illustrates a case where the power failure of the system power supply has been restored thereafter. When the power failure of the system power supply is restored, and the first power supply 23 starts outputting electric power, the microcomputer 3 is activated by using electric power output from the first power supply 23. The microcomputer 3 monitors the flag stored in the ROM, and outputs, as the flag is on (indicates a high level), a high level signal Sig-22 to the second input terminal of the OR circuit 26.

The OR circuit 26 operates using electric power output from the first power supply 23. Since the signal Sig-22 is at a high level, the OR circuit 26 outputs a high level signal Sig-23 to the power supply control switch 22.

The power supply control switch 22 operates using electric power output from the first power supply 23. Since the signal Sig-23 is at a high level, the power supply control switch 22 outputs a high level signal Sig-24 to the second power supply 24.

Since the signal Sig-24 is at a high level, the second power supply 24 is activated and outputs electric power to the CPU 44. The CPU 44 starts up and operates using electric power output from the second power supply 24.

That is, when the power failure of the system power supply is restored, the image forming apparatus 101 is enabled to start up without a user's pressing of the push switch SW.

However, in the image forming apparatus 101, there is an apparent increase in hardware cost due to incorporation of the microcomputer 3, an increase in development person-hours for software coding of the microcomputer 3, and an increase in plug-in power consumption.

In addition, such a microcomputer 3 is responsible for determining whether the power supply has been turned off due to power failure of the system power supply or the power supply has been turned off by a user's operation, and executing a process of changing an activation method based on the determination; however, there appears to be an increase in an activation time due to the processing time of the microcomputer 3.

First Embodiment

Figure 3:
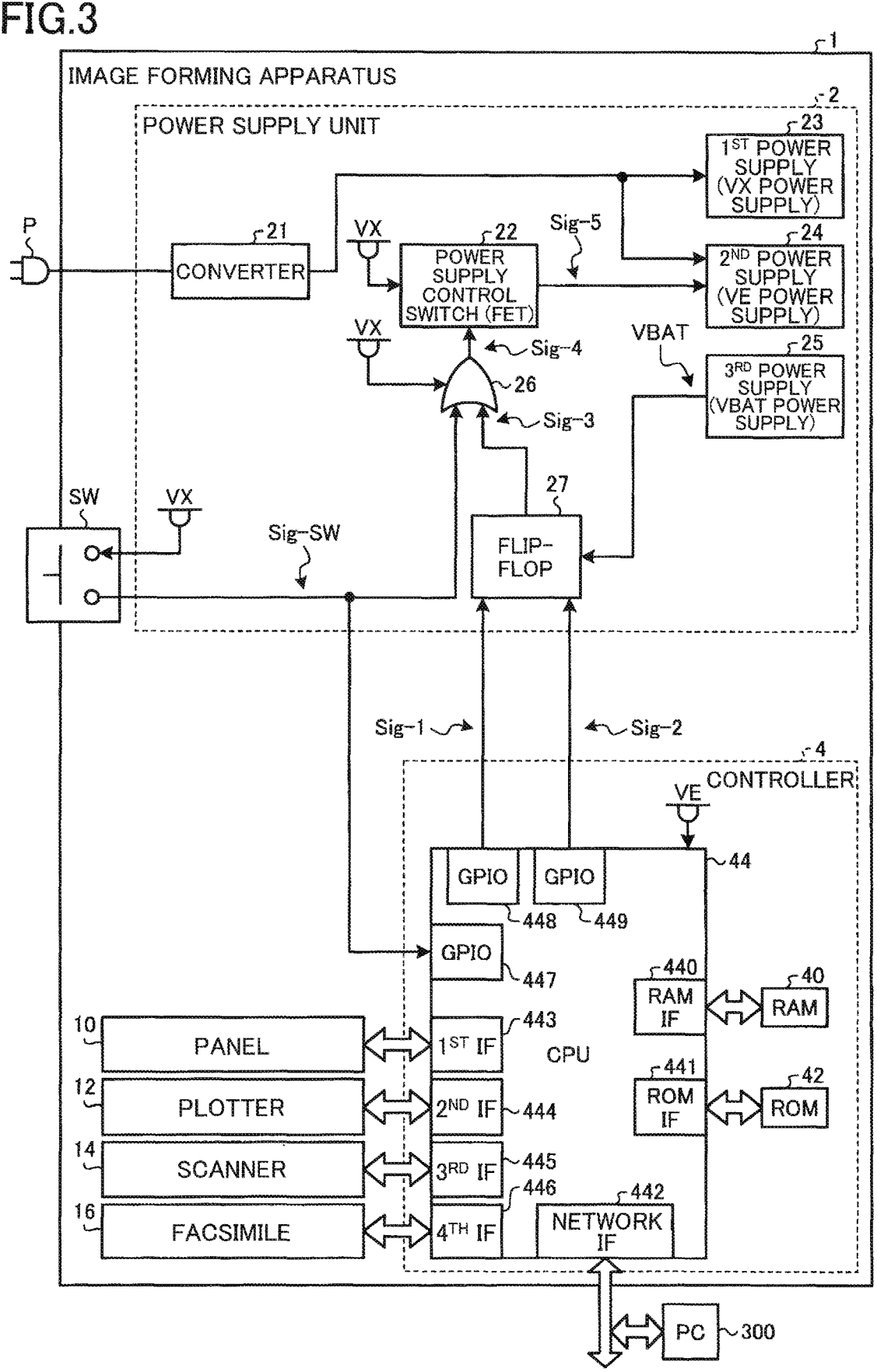
FIG. 3 is a block diagram illustrating a configuration of an image forming apparatus according to a first embodiment.

FIG. 3 is a block diagram illustrating a configuration of an image forming apparatus according to a first embodiment. Components that are the same as those of the first and second comparative examples are denoted by the same reference numerals, and description of those components is omitted.

An image forming apparatus 1, which is an electronic apparatus, includes a power supply unit 2 acting as a power supply device instead of the power supply unit 200 of the first and second comparative examples.

The power supply unit 2 further includes a third power supply (VBAT power supply) 25 and a flip-flop 27, in addition to the components of the power supply unit 200.

The third power supply 25 outputs a third voltage VBAT to the flip-flop 27 by the battery built in the image forming apparatus 1. The flip-flop 27 is connected to the third power supply 25 and receives the third voltage VBAT, and thereby operates using electric power output from the third power supply 25. The third voltage VBAT may be the same as or different from the first voltage VX or the second voltage VE.

Note that in general, an image forming apparatus incorporates a battery to measure time. The third power supply 25 may use the battery for measuring time. Since the consumption current of the flip-flop 27 is approximately 2 μA (micro ampere), the effect of the power consumption of the flip-flop 27 on the battery is very small.

The following illustrates a case where the push switch SW is pressed by a user in order to activate the image forming apparatus 1. When a user presses the push switch SW, the push switch SW outputs a high level signal Sig-SW to the first input terminal of the OR circuit 26.

The OR circuit 26 is connected to the first power supply 23 and receives the first voltage VX, and thereby operates using electric power output from the first power supply 23. Upon receiving of the high level signal Sig-SW, the OR circuit 26 outputs a high level signal Sig-4 to the power supply control switch 22.

The power supply control switch 22 is connected to the first power supply 23 and receives the first voltage VX, and thereby operates using electric power output from the first power supply 23. Upon receiving of the high level signal Sig-4, the power supply control switch 22 outputs a high level signal Sig-5 to the second power supply 24.

Upon receiving of the high level signal Sig-5 from the power supply control switch 22, the second power supply 24 outputs a second voltage VE to the controller 4, the panel 10, the plotter 12, the scanner 14, and the facsimile 16. The controller 4, the panel 10, the plotter 12, the scanner 14, and the facsimile 16 are activated and operated by using electric power output from the second power supply 24.

The CPU 44 is connected to the second power supply 24 and receives the second voltage VE, and is thus activated (power on) upon receiving of and electric power output from the second power supply 24. Upon activation, the CPU 44 outputs a high level signal Sig-1, which is a first logic value, from a GPIO 448 to a data input terminal of the flip-flop 27. Thereafter, the CPU 44 outputs a signal Sig-2, which is a trigger signal representing a timing of latching and storing a data signal, from a GPIO 449 to a trigger input terminal of the flip-flop 27.

At a rising edge of the trigger signal Sig-2, the flip-flop 27 stores the high level signal Sig-1 as a flag. Since the flip-flop 27 stores the high level flag, the flip-flop 27 outputs a high level signal Sig-3 to the second input terminal of the OR circuit 26.

As a result, when a user stops pressing the push switch SW, the signal Sig-4 output from the OR circuit 26 is maintained at a high level, and the signal Sig-5 output from the power supply control switch 22 is also maintained at a high level. Thus, the second power supply 24 maintains the output of the second voltage VE.

The following illustrates a case where the push switch SW is pressed by a user in order to shut down the image forming apparatus 1 when the image forming apparatus 1 is activated. When a user presses the push switch SW, the push switch SW outputs a high level signal Sig-SW to a GPIO 447. Upon receiving of the high level signal Sig-SW via the GPIO 447, the CPU 44 outputs a low level signal Sig-1, which is a second logic value, from a GPIO 448 to the data input terminal of the flip-flop 27. Thereafter, the CPU 44 outputs the trigger signal Sig-2 from the GPIO 449 to the trigger input terminal of the flip-flop 27.

At a rising edge of the trigger signal Sig-2, the flip-flop 27 stores the low level signal Sig-1 as a flag. Since the flip-flop 27 stores the low level flag, the flip-flop 27 outputs a low level signal Sig-3 to the second input terminal of the OR circuit 26.

As a result, when a user stops pressing the push switch SW, the signal Sig-4 output from the OR circuit 26 becomes a low level, and the signal Sig-5 output from the power supply control switch 22 becomes a low level. As a result, the second power supply 24 is powered off, and the output of the second voltage VE is stopped. When the output of the second voltage VE stops, the CPU 44 is stopped (powered off), and the image forming apparatus 1 shuts down.

Next, the following illustrates a case where a power failure occurs in the system power supply when the image forming apparatus 1 is activated. When the image forming apparatus 1 is activated, the flip-flop 27 stores a high level flag. When a power failure occurs in the system power supply while the image forming apparatus 1 is being activated, the first power supply 23 is powered off, and the output of the first voltage VX is stopped. When the output of the first voltage VX stops, the OR circuit 26 and the power supply control switch 22 are powered off, and the signal Sig-5 becomes a low level. As a result, the second power supply 24 is powered off, and the output of the second voltage VE is stopped. When the output of the second voltage VE stops, the CPU 44 stops.

When the output of the first voltage VX stops and the signal Sig-1 becomes a low level, the signal Sig-2 as the trigger signal remains low level and does not become high level. Thus, the flip-flop 27 continues to store the high level flag using electric power output from the third power supply 25.

The following illustrates a case where the power failure of the system power supply has been restored thereafter. The flip-flop 27 outputs the high level signal Sig-3 to the second input terminal of the OR circuit 26 by using electric power output from the third power supply 25.

When the power failure of the system power supply is restored, and the first power supply 23 starts outputting the first voltage VX, the OR circuit 26 operates using electric power output from the first power supply 23. Since the signal Sig-3 is at a high level, the OR circuit 26 outputs a high level signal Sig-4 to the power supply control switch 22.

The power supply control switch 22 operates using electric power output from the first power supply 23. Since the signal Sig-4 is at a high level, the power supply control switch 22 outputs a high level signal Sig-5 to the second power supply 24.

Since the signal Sig-5 is at a high level, the second power supply 24 is activated and outputs second electric power VE to the CPU 44. The CPU 44 starts up and operates using electric power output from the second power supply 24.

That is, when the power failure of the system power supply is restored, the image forming apparatus 1 is enabled to start up without a user's pressing of the push switch SW.

Figure 4:
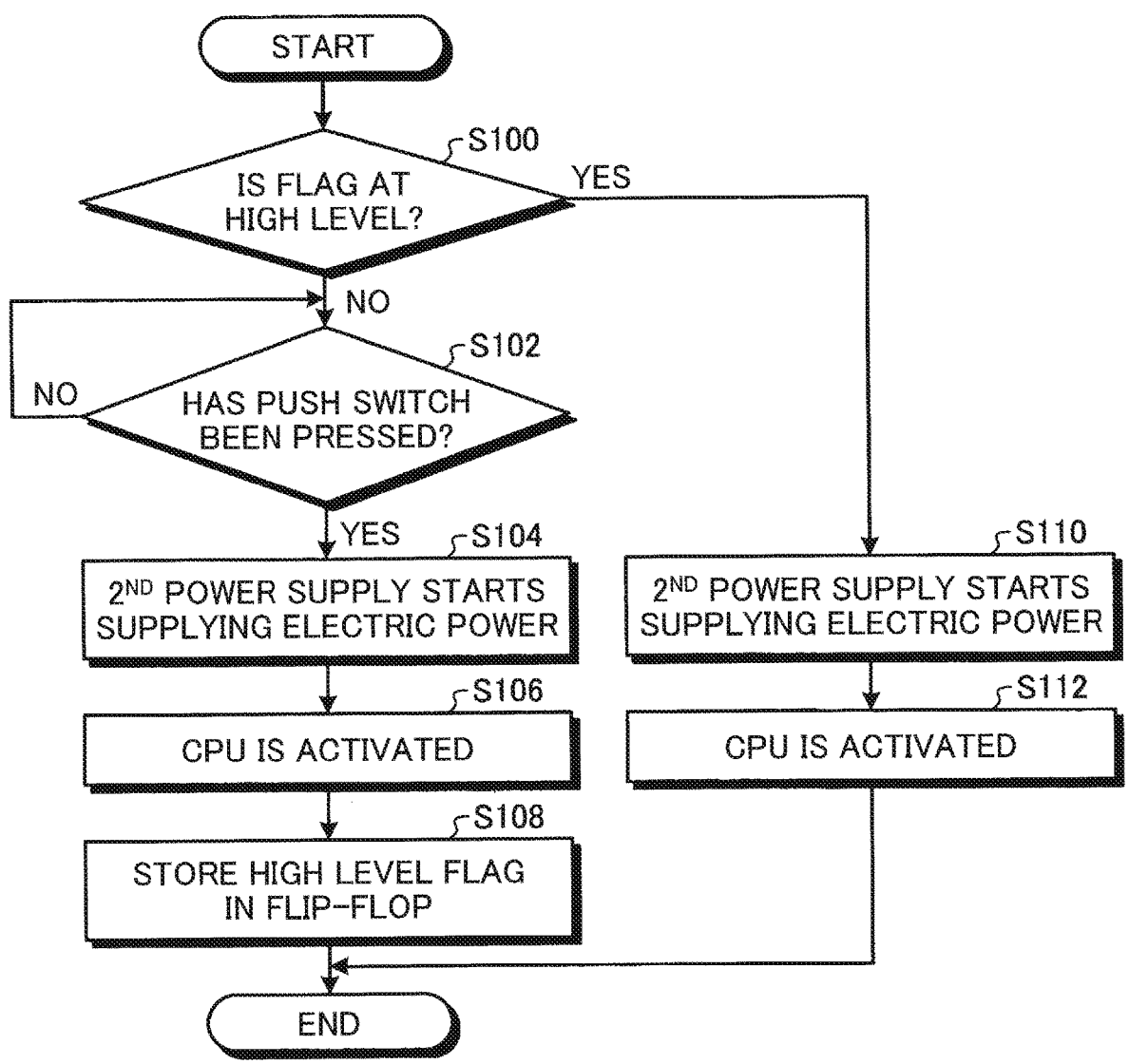
FIG. 4 is a flowchart illustrating an operation of the image forming apparatus according to the first embodiment.

FIG. 4 is a flowchart illustrating an operation of an image forming apparatus according to the first embodiment. More specifically, FIG. 4 is a flowchart illustrating an operation upon activation of the image forming apparatus 1.

In step S100, when a flag stored in the flip-flop 27 is not at a high level, the image forming apparatus 1 advances a process to step S102, and when the flag is at a high level, the image forming apparatus 1 advances the process to step S110.

In step S102, the image forming apparatus 1 waits until the push switch SW is pressed. Upon depression of the push switch SW, the image forming apparatus 1 advances the process to step S104.

In step S104, the second power supply 24 of the image forming apparatus 1 starts outputting electric power.

In step S106, the CPU 44 of the image forming apparatus 1 is activated using electric power output from the second power supply 24.

In step S108, the CPU 44 of the image forming apparatus 1 causes the flip-flop 27 to store a high level flag, and ends the process.

When the flag is at the high level in step S100, the second power supply 24 of the image forming apparatus 1 starts outputting electric power in step S110.

In step S112, the CPU 44 of the image forming apparatus 1 is activated using electric power output from the second power supply 24, and ends the process.

Figure 5:
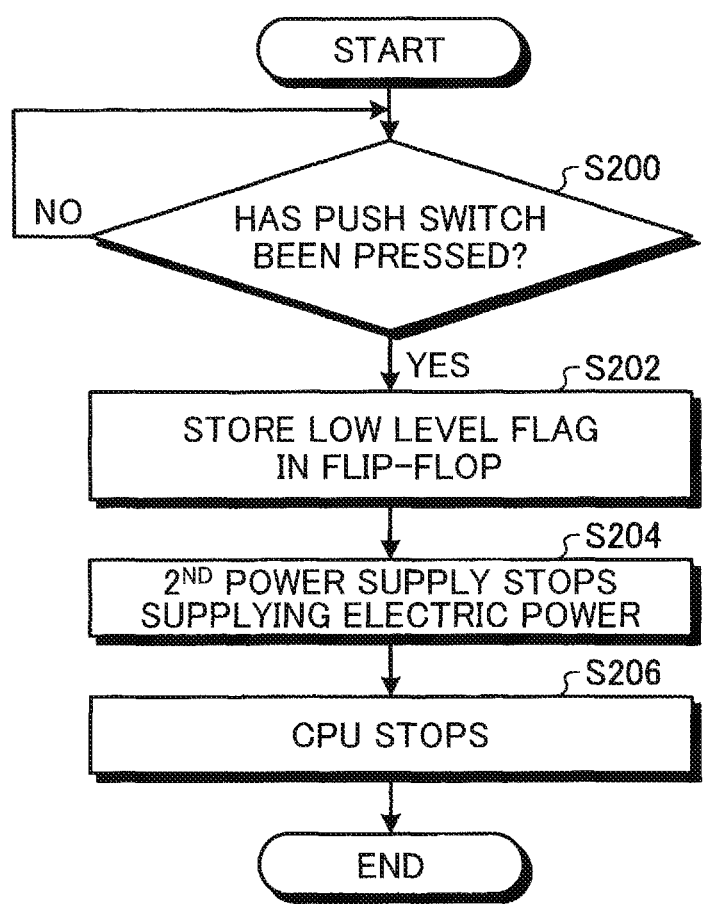
FIG. 5 is a flowchart illustrating an operation of the image forming apparatus according to the first embodiment.

FIG. 5 is a flowchart illustrating an operation of an image forming apparatus according to the first embodiment. More specifically, FIG. 5 is a flowchart illustrating an operation upon the image forming apparatus 1 being shut down by a user.

In step S200, the image forming apparatus 1 waits until the push switch SW is pressed. Upon depression of the push switch SW, the image forming apparatus 1 advances a process to step S202.

In step S202, the CPU 44 of the image forming apparatus 1 causes the flip-flop 27 to store a low level flag.

In step S204, the second power supply 24 of the image forming apparatus 1 stops outputting electric power.

The CPU 44 of the image forming apparatus 1 stops in step S206. As a result, the image forming apparatus 1 shuts down.

As described above, when the power failure of the system power supply is restored, the image forming apparatus 1 is enabled to start up without a user's pressing of the push switch SW.

The hardware price of the flip-flop 27 is approximately 25 yen, which is lower than that of the microcomputer 3. Accordingly, as compared to the image forming apparatus 101, the hardware cost of the image forming apparatus 1 may be reduced.

In addition, the flip-flop 27 requires no software. Accordingly, as compared to the image forming apparatus 101, the development man-hour of software coding required for the image forming apparatus 1 may be reduced.

Further, the flip-flop 27 operates using electric power from the battery. Thus, the plug-in power consumption required for the image forming apparatus 1 may be reduced.

Further, in the image forming apparatus 101, the microcomputer 3 determines whether the power is turned off by a power failure or whether the power is turned off by a user's operation on the push switch SW, and executes a process of changing an activation method. Hence, in the image forming apparatus 101, there appears to be an increase in activation time due to the processing time of the microcomputer 3.

By contrast, in the image forming apparatus 1, since the flip-flop 27 outputs the high level signal Sig-3, the second power supply 24 will be activated only by waiting for the delay time of the OR circuit 26 and the power supply control switch 22. Thus, the activation time required for the image forming apparatus 1 may be reduced.

Second Embodiment

Figure 6:
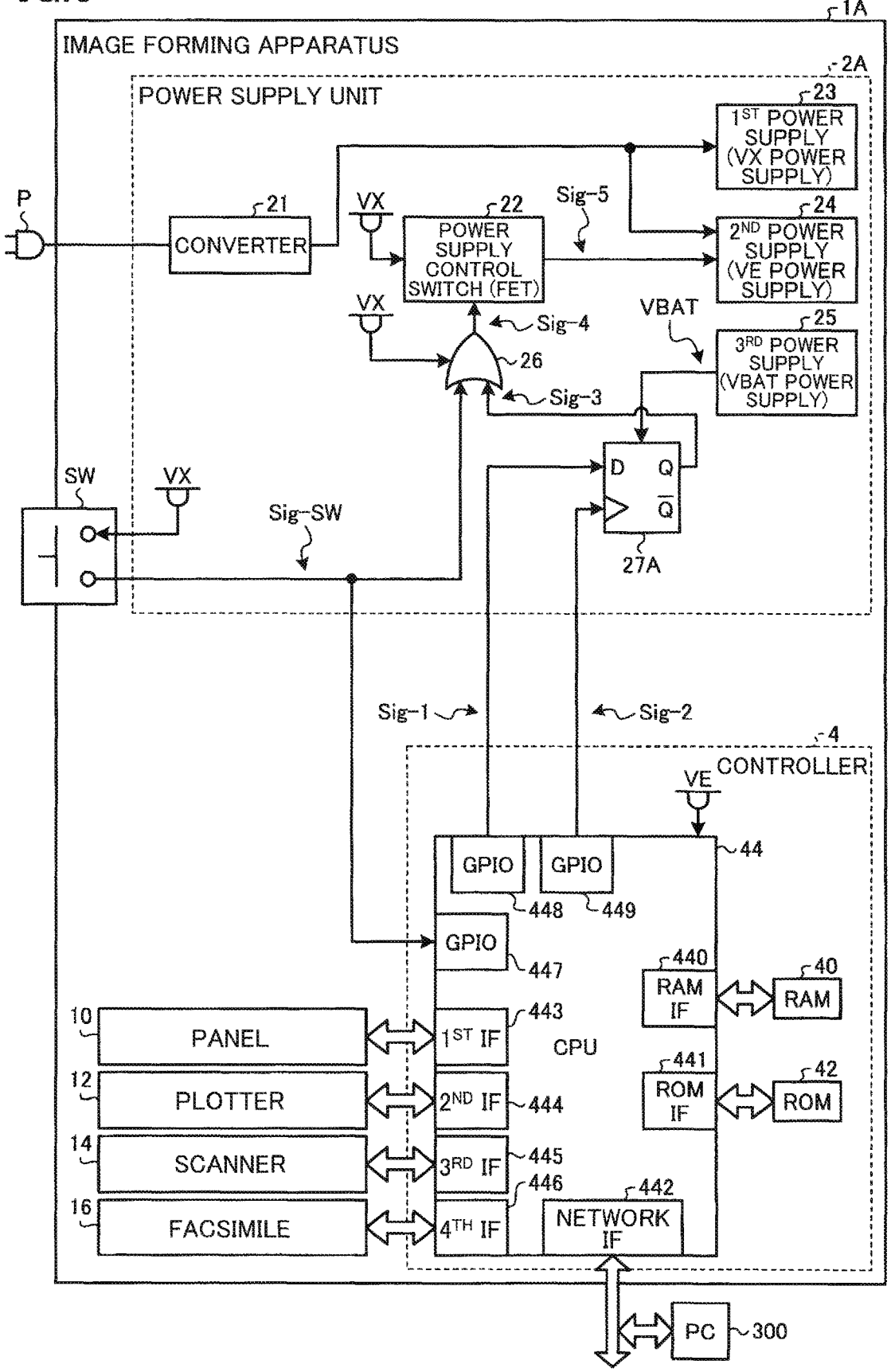
FIG. 6 is a block diagram illustrating a configuration of an image forming apparatus according to a second embodiment.

FIG. 6 is a block diagram illustrating a configuration of an image forming apparatus according to a second embodiment. Components that are the same as those of the first and the second comparative examples, and the first embodiment are denoted by the same reference numerals, and description of those components is omitted.

As compared with the power supply unit 2 of the image forming apparatus 1 according to the first embodiment, a power supply unit 2A of an image forming apparatus 1A according to the second embodiment includes a D-type flip-flop 27A instead of the flip flop 27. The D-type flip-flop 27A is connected to the third power supply 25 and receives the third voltage VBAT, and thereby operates using electric power output from the third power supply 25.

The D-type flip-flop 27A includes a D (data) terminal to which a data signal is input and a CLK (clock) terminal to which a trigger signal indicating the timing of latching and storing the data signal is input.

The D-type flip-flop 27A latches the signal Sig-1 at the timing of the rising edge of the trigger signal from the low level to the high level, and stores the signal Sig-1 as a flag. At a timing other than the rising edge of the trigger signal, the D-type flip-flop 27A continues to store the currently stored flag.

The D-type flip-flop 27A has a Q terminal for outputting a non-inverted result of the stored flag, and a Q bar terminal for outputting an inverted result of the stored flag. The D-type flip-flop 27A outputs a signal Sig-3 from the Q terminal to the second input terminal of the OR circuit 26.

The operation of the image forming apparatus 1A is the same as the operation of the image forming apparatus 1 of the first embodiment, and the description of the image forming apparatus 1A will be thus omitted.

The image forming apparatus 1A according to the second embodiment exhibits the same advantages as those of the image forming apparatus 1 according to the first embodiment.

Third Embodiment

A reset circuit is installed on a board on which a control IC exemplified by a CPU is installed. The reset circuit is configured to monitor the power supply state of a control IC, and to reset the control IC or cancel the reset according to the power supply state. In the third embodiment, such a reset circuit is used.

Figure 7:
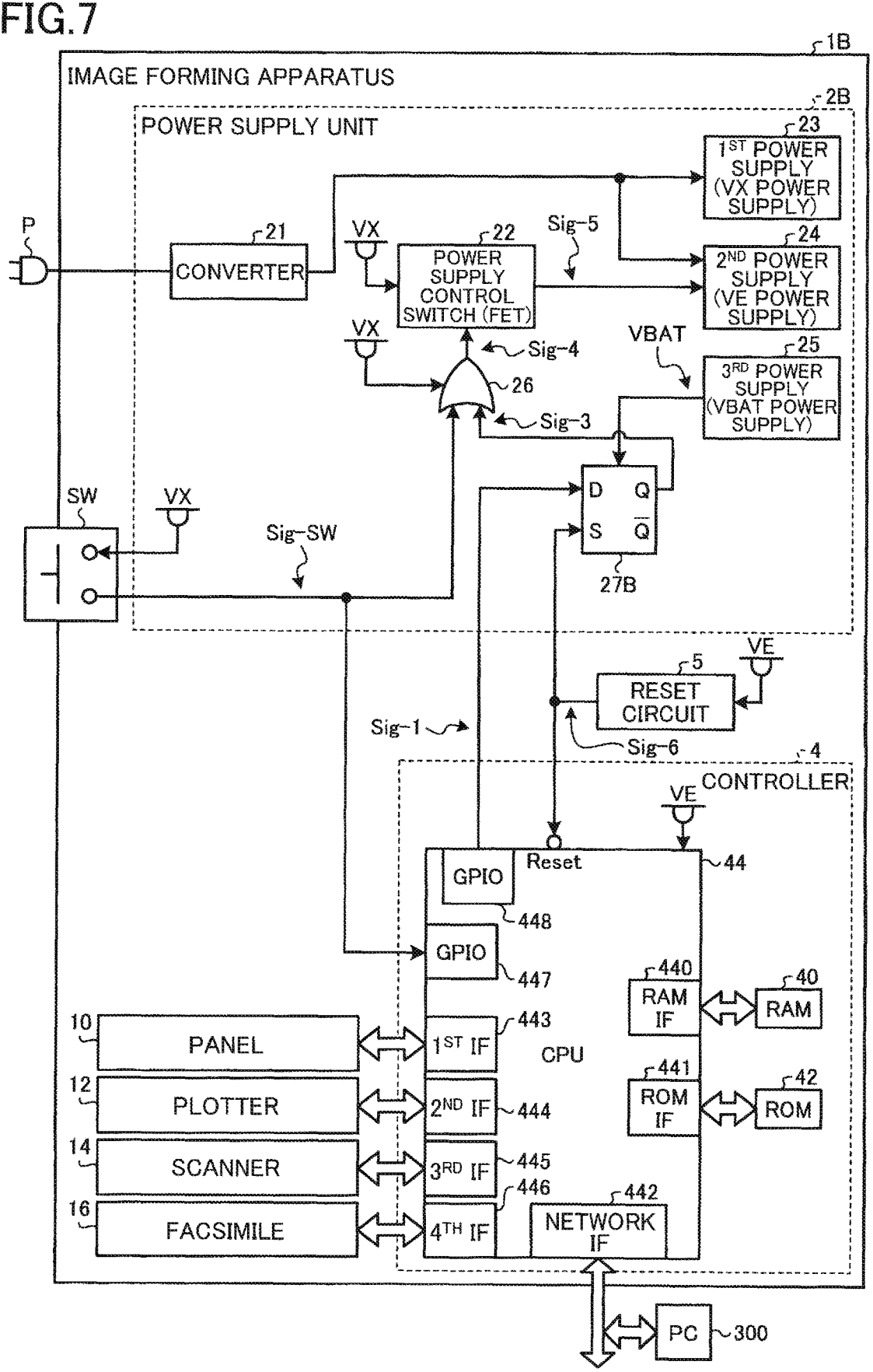
FIG. 7 is a block diagram illustrating a configuration of an image forming apparatus according to a third embodiment.

FIG. 7 is a block diagram illustrating a configuration of an image forming apparatus according to a third embodiment. Components that are the same as those of the first and the second comparative examples, and the first and the second embodiments already described are denoted by the same reference numerals, and description of those components is omitted.

As compared with the power supply unit 2 of the image forming apparatus 1 according to the first embodiment, a power supply unit 2B of an image forming apparatus 1B according to the third embodiment includes a set terminal-equipped D-type flip-flop 27B instead of the flip flop 27. The set terminal-equipped D-type flip-flop 27B is connected to the third power supply 25 and receives the third voltage VBAT, and thereby operates using electric power output from the third power supply 25.

When a high level signal Sig-6 is input to the set terminal S (of the set terminal-equipped D-type flip-flop 27B), the set terminal-equipped D-type flip-flop 27B stores the signal Sig-1 input to the D terminal (of the set terminal-equipped D-type flip-flop 27B) as a flag, and outputs a signal Sig-3 from the Q terminal. When a low level signal Sig-6 is input to the set terminal S (of the set terminal-equipped D-type flip-flop 27B), the set terminal-equipped D-type flip-flop 27B continues to store the currently stored flag and output the signal Sig-3 from the Q terminal.

The image forming apparatus 1B includes a reset circuit 5. The reset circuit 5 is connected to the second power supply 24 and receives the second voltage VE, and thereby operates using electric power output from the second power supply 24.

The following illustrates a case where the push switch SW is pressed by a user in order to activate the image forming apparatus 1B. When a user presses the push switch SW, the push switch SW outputs a high level signal Sig-SW to the first input terminal of the OR circuit 26. Upon receiving of the high level signal Sig-SW, the OR circuit 26 outputs a high level signal Sig-4 to the power supply control switch 22.

Upon receiving of the high level signal Sig-4, the power supply control switch 22 outputs a high level signal Sig-5 to the second power supply 24. Upon receiving of the high level signal Sig-5 input from the power supply control switch 22, the second power supply 24 outputs the second voltage VE to the reset circuit 5.

The reset circuit 5 starts up and operates using electric power output from the second power supply 24. The reset circuit 5 outputs the high level signal Sig-6 to a reset terminal Reset of the CPU 44 and also to the set terminal S (of the set terminal-equipped D-type flip-flop 27B).

The CPU 44 is activated upon the high level signal Sig-6 being input to the reset terminal Reset. Upon activation, the CPU 44 outputs a high level signal Sig-1 from the GPIO 448 to the data input terminal D of the set terminal-equipped D-type flip-flop 27B.

Since the high level signal Sig-6 is input to the set terminal S (of the set terminal-equipped D-type flip-flop 27B), the set terminal-equipped D-type flip-flop 27B stores the high level signal Sig-1 as a flag. Since the set terminal-equipped D-type flip-flop 27B stores the high level flag, the set terminal-equipped D-type flip-flop 27B outputs a high level signal Sig-3 from the Q terminal to the second input terminal of the OR circuit 26.

When a user stops pressing the push switch SW, the signal Sig-4 output from the OR circuit 26 is maintained at a high level, and the signal Sig-5 output from the power supply control switch 22 is also maintained at a high level. Thus, the second power supply 24 maintains the output of the second voltage VE.

The following illustrates a case where the push switch SW is pressed by a user in order to shut down the image forming apparatus 1B when the image forming apparatus 1B is activated. When a user presses the push switch SW, the push switch SW outputs a high level signal Sig-SW to a GPIO 447. Upon receiving of the high level signal Sig-SW via the GPIO 447, the CPU 44 outputs a low level signal Sig-1, which is a second logic value, from the GPIO 448 to a data input terminal D of the set terminal-equipped D-type flip-flop 27B.

Since the high level signal Sig-6 is input to the set terminal S (of the set terminal-equipped D-type flip-flop 27B), the set terminal-equipped D-type flip-flop 27B stores the low level signal Sig-1 as a flag. Since the set terminal-equipped D-type flip-flop 27B stores the low level flag, the set terminal-equipped D-type flip-flop 27B outputs a low level signal Sig-3 from the Q terminal to the second input terminal of the OR circuit 26.

When a user stops pressing the push switch SW, the signal Sig-4 output from the OR circuit 26 becomes a low level, and the signal Sig-5 output from the power supply control switch 22 becomes a low level. As a result, the second power supply 24 is powered off, and the output of the second voltage VE is stopped. When the output of the second voltage VE stops, the CPU 44 is stopped (powered off), and the image forming apparatus 1B shuts down.

Next, the following illustrates a case where a power failure occurs in the system power supply when the image forming apparatus 1B is activated. When the image forming apparatus 1B is activated, the set terminal-equipped D-type flip-flop 27B stores a high level flag. When a power failure occurs in the system power supply while the image forming apparatus 1B is being activated, the first power supply 23 is powered off, and the output of the first voltage VX is stopped. When the output of the first voltage VX stops, the OR circuit 26 and the power supply control switch 22 are powered off, and the signal Sig-5 becomes a low level. As a result, the second power supply 24 is powered off, and the output of the second voltage VE is stopped.

Here, when the second voltage VE becomes lower than an operation threshold voltage of the reset circuit 5, the signal Sig-6 becomes a low level. Accordingly, when the low level signal Sig-6 is input to the set terminal S (of the set terminal-equipped D-type flip-flop 27B), the set terminal-equipped D-type flip-flop 27B stores the signal Sig-1 at the timing when the signal Sig-6 changes from the high level to the low level; that is, the set terminal-equipped D-type flip-flop 27B stores the high level signal Sig-1 as a flag. Thus, the set terminal-equipped D-type flip-flop 27B continues to store the high level flag using electric power output from the third power supply 25.

Thereafter, the CPU 44 stops, and the signal Sig-1 becomes a low level. However, since the low level signal Sig-6 is input to the set terminal S of the set terminal-equipped D-type flip-flop 27B, the set terminal-equipped D-type flip-flop 27B continues to store the high level signal Sig-1 as a flag.

The following illustrates a case where the power failure of the system power supply has been restored thereafter. The set terminal-equipped D-type flip-flop 27B outputs the high level signal Sig-3 to the second input terminal of the OR circuit 26 by using electric power output from the third power supply 25.

When the power failure of the system power supply is restored, and the first power supply 23 starts outputting the first voltage VX, the OR circuit 26 operates using electric power output from the first power supply 23. Since the signal Sig-3 is at a high level, the OR circuit 26 outputs a high level signal Sig-4 to the power supply control switch 22.

Since the signal Sig-4 is at a high level, the power supply control switch 22 outputs a high level signal Sig-5 to the second power supply 24. Since the signal Sig-5 is at a high level, the second power supply 24 is activated and outputs second electric power VE to the CPU 44. The CPU 44 starts up and operates using electric power output from the second power supply 24.

That is, when the power failure of the system power supply is restored, the image forming apparatus 1B is enabled to start up without a user's pressing of the push switch SW.

The image forming apparatus 1B according to the third embodiment exhibits the same advantages as those of the image forming apparatus 1 according to the first embodiment.

Furthermore, compared to the image forming apparatuses 1 and 1A, the image forming apparatus 1B is enabled to reduce wiring (wiring for transmitting the signal Sig-2) between the CPU 44 and the set terminal-equipped D-type flip flop 27B.

Fourth Embodiment

Figure 8:
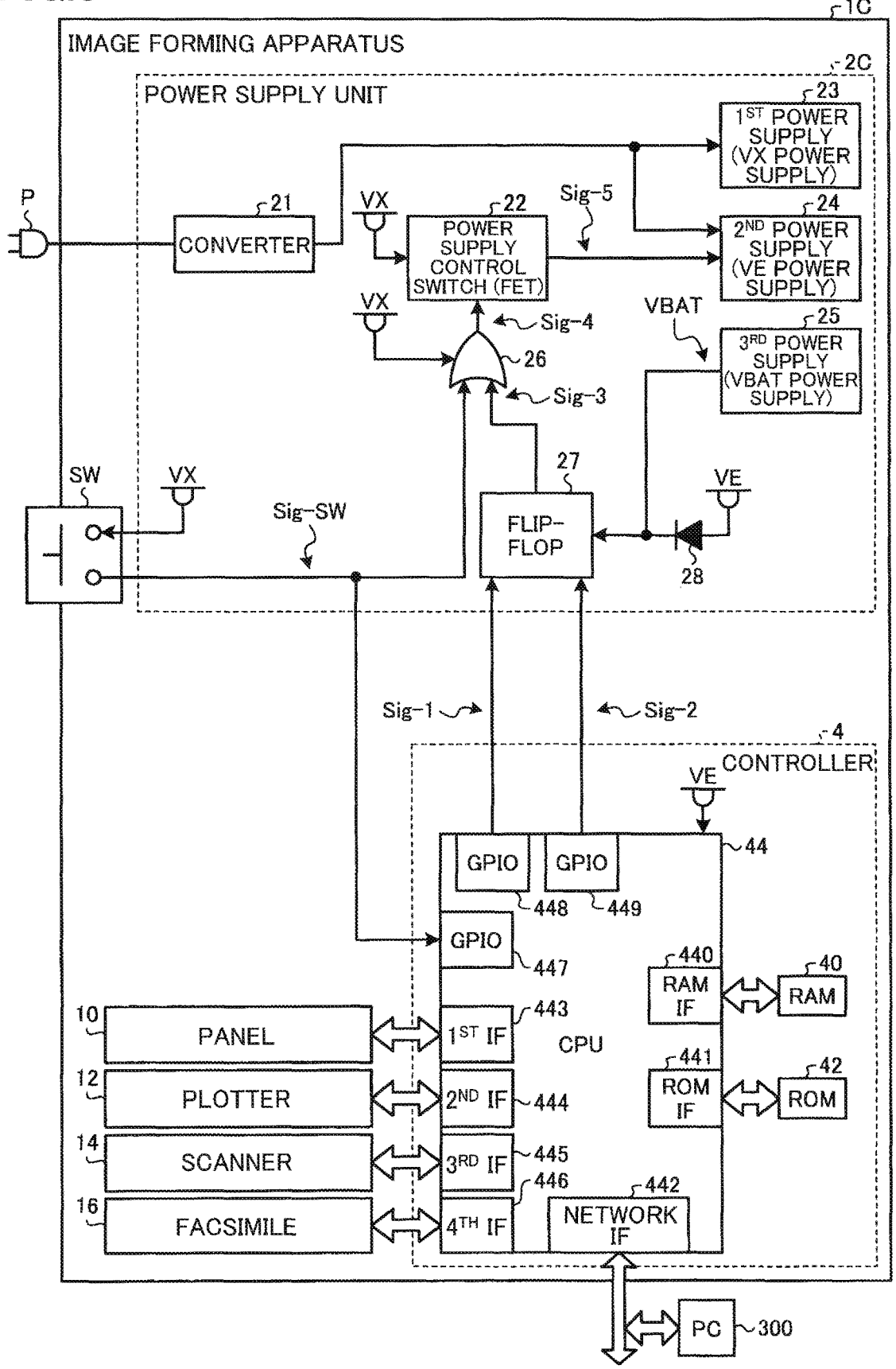
FIG. 8 is a block diagram illustrating a configuration of an image forming apparatus according to a fourth embodiment.

FIG. 8 is a block diagram illustrating a configuration of an image forming apparatus according to a fourth embodiment. Components that are the same as those of the first and the second comparative examples, and the first to the third embodiments already described are denoted by the same reference numerals, and description of those components is omitted.

As compared with the power supply unit 2 of the image forming apparatus 1 according to the first embodiment, a power supply unit 2C of the image forming apparatus 1C according to the fourth embodiment further includes a diode 28. An anode of the diode 28 is connected to the second power supply 24, and a cathode of the diode 28 is connected to the flip-flop 27.

When the second power supply 24 outputs the second voltage VE, the flip-flop 27 operates using electric power output from the second power supply 24.

When the second power supply 24 does not output the second voltage VE, the flip-flop 27 operates using electric power output from the third power supply 25. In this case, the diode 28 controls against the current flowing from the third power supply 25 to the second power supply 24.

The image forming apparatus 1C according to the fourth embodiment exhibits the same advantages as those of the image forming apparatus 1 according to the first embodiment.

Further, when the second power supply 24 outputs the second voltage VE, the flip-flop 27 operates using the electric power output from the second power supply 24; thus, the image forming apparatus 1C is enabled to control against the use of the amount of electric power stored in a battery. As a result, the image forming apparatus 1C is enabled to reduce the capacity of the battery and to further reduce the cost.

Fifth Embodiment

Figure 9:
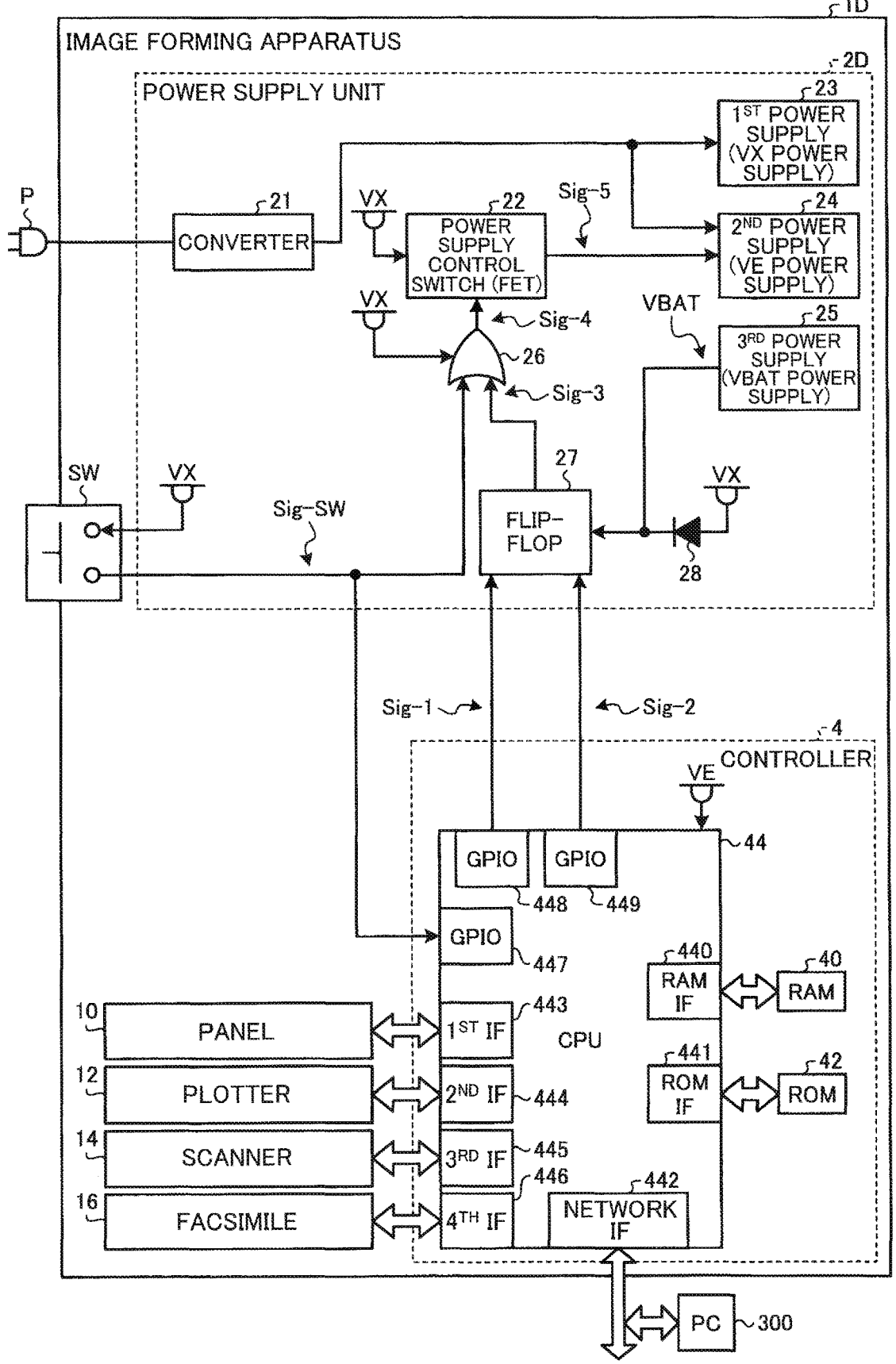
FIG. 9 is a block diagram illustrating a configuration of an image forming apparatus according to a fifth embodiment.

FIG. 9 is a block diagram illustrating a configuration of an image forming apparatus according to a fifth embodiment. Components that are the same as those of the first and the second comparative examples, and the first to the fourth embodiments already described are denoted by the same reference numerals, and description of those components is omitted.

Comparing a power supply unit 2D of an image forming apparatus 1D according to the fifth embodiment with the power supply unit 2C of the image forming apparatus 1C according to the fourth embodiment, the anode of the diode 28 is connected to the first power supply 23, and a cathode of the diode 28 is connected to the flip-flop 27.

When the first power supply 23 outputs the first voltage VX, the flip-flop 27 operates using electric power output from the first power supply 23.

When the first power supply 23 does not output the first voltage VX, the flip-flop 27 operates using electric power output from the third power supply 25. In this case, the diode 28 controls against the current flowing from the third power supply 25 to the first power supply 23.

The image forming apparatus 1D according to the fifth embodiment exhibits the same advantages as those of the image forming apparatus 1 according to the first embodiment.

Further, when the first power supply 23 outputs the first voltage VX, the flip-flop 27 operates using the electric power output from the first power supply 23; thus, the image forming apparatus 1D is enabled to control against the use of the amount of electric power stored in a battery. As a result, the image forming apparatus 1D is enabled to reduce the capacity of the battery and to further reduce the cost.

Sixth Embodiment

Figure 10:
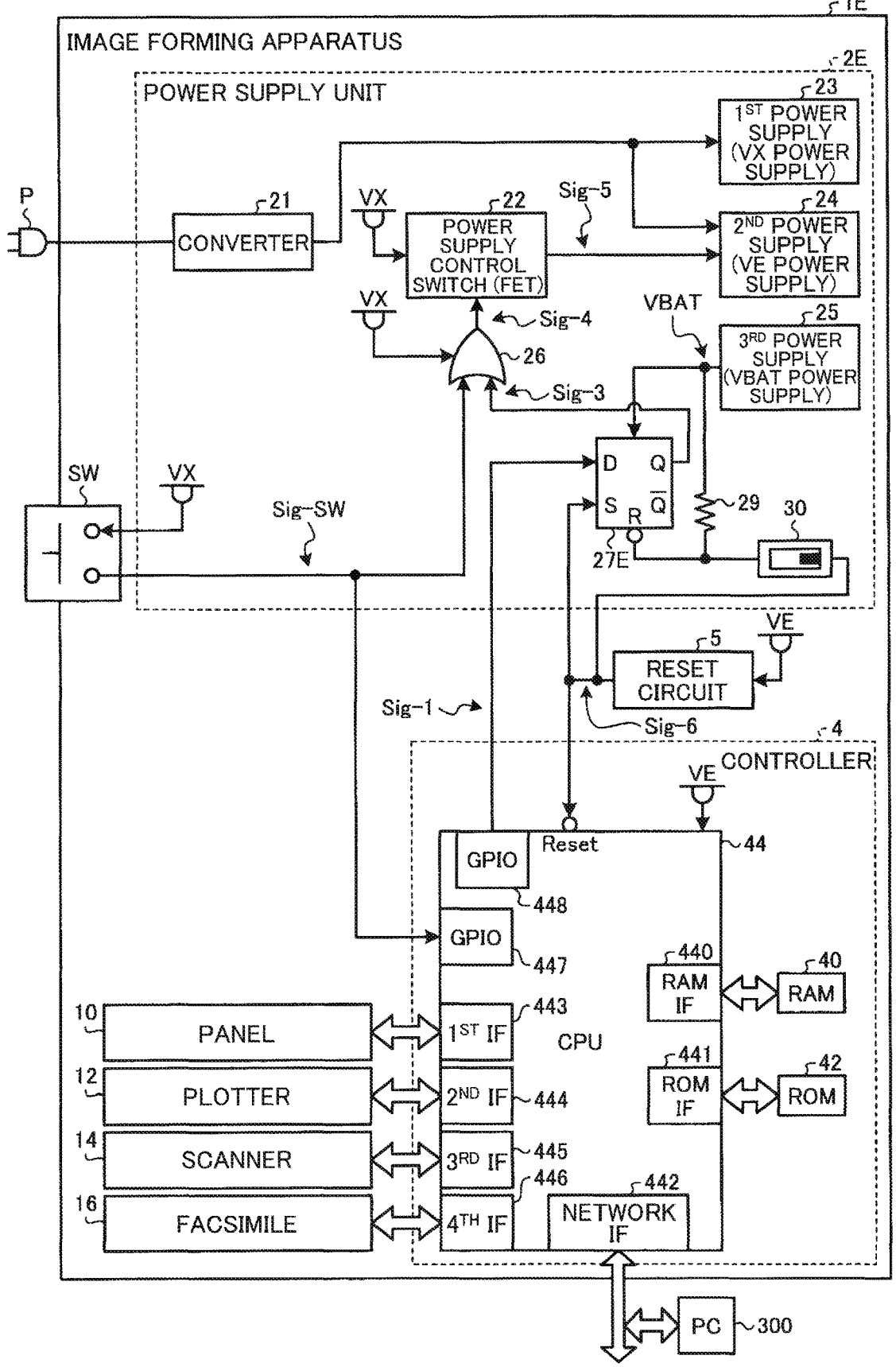
FIG. 10 is a block diagram illustrating a configuration of an image forming apparatus according to a sixth embodiment.

FIG. 10 is a block diagram illustrating a configuration of an image forming apparatus according to a sixth embodiment. Components that are the same as those of the first and the second comparative examples, and the first to the fifth embodiments already described are denoted by the same reference numerals, and description of those components is omitted.

Comparing a power supply unit 2E of an image forming apparatus 1E according to the sixth embodiment with the power supply unit 2B of the image forming apparatus 1B according to the third embodiment, the power supply unit 2E of the image forming apparatus 1E according to the sixth embodiment includes a set/reset terminal-equipped D-type flip-flop 27E instead of the set terminal-equipped D-type flip-flop 27B. Further, the power supply unit 2E includes a resistor 29 and a DIP switch 30.

The set/reset terminal-equipped D-type flip-flop 27E is connected to the third power supply 25 and receives the third voltage VBAT, and thereby operates using electric power output from the third power supply 25.

A reset terminal R of the set/reset terminal-equipped D-type flip-flop 27E is pulled up to the third voltage VBAT via the resistor 29.

The DIP switch 30 is connected between the output terminal of the reset circuit 5 and the reset terminal R of the set/reset terminal-equipped D-type flip-flop 27E.

When a high level signal is input to the reset terminal R (of the set/reset terminal-equipped D-type flip-flop 27E), the set/reset terminal-equipped D-type flip-flop 27E performs the same operation as the set terminal-equipped D-type flip-flop 27B (see FIG. 7).

When a low level signal is input to the reset terminal R (of the set/reset terminal-equipped D-type flip-flop 27E), the set/reset terminal-equipped D-type flip-flop 27E clears the flag to the low level and outputs a low level signal Sig-3 from the Q terminal to the second input terminal of the OR circuit 26.

When the DIP switch 30 is set to an ON state, the DIP switch 30 electrically conducts between the output terminal of the reset circuit 5 and the reset terminal R of the set/reset terminal-equipped D-type flip-flop 27E. When the DIP switch 30 is set to an OFF state, the DIP switch 30 electrically disconnects between the output terminal of the reset circuit 5 and the reset terminal R of the set/reset terminal-equipped D-type flip-flop 27E.

When the DIP switch 30 is set to the OFF state, the reset terminal R of the set/reset terminal-equipped D-type flip-flop 27E is pulled up to the third voltage VBAT. As a result, the set/reset terminal-equipped D-type flip-flop 27E performs the same operation as the set terminal-equipped D-type flip-flop 27B.

The following illustrates an operation of the image forming apparatus 1E when the DIP switch 30 is set to the ON state.

The following illustrates a case where the push switch SW is pressed by a user in order to activate the image forming apparatus 1E. When a user presses the push switch SW, the push switch SW outputs a high level signal Sig-SW to the first input terminal of the OR circuit 26. Upon receiving of the high level signal Sig-SW, the OR circuit 26 outputs a high level signal Sig-4 to the power supply control switch 22.

Upon receiving of the high level signal Sig-4, the power supply control switch 22 outputs a high level signal Sig-5 to the second power supply 24. Upon receiving of the high level signal Sig-5 input from the power supply control switch 22, the second power supply 24 outputs the second voltage VE to the reset circuit 5.

The reset circuit 5 starts up and operates using electric power output from the second power supply 24. The reset circuit 5 outputs the high level signal Sig-6 to a reset terminal Reset of the CPU 44 and also to the reset terminal R of the set/reset terminal-equipped D-type flip-flop 27E.

The CPU 44 is activated when the high level signal Sig-6 is input to the reset terminal Reset. Upon activation, the CPU 44 outputs a high level signal Sig-1 from the GPIO 448 to the data input terminal D of the set/reset terminal-equipped D-type flip-flop 27E.

Since the high level signal Sig-6 is input to the reset terminal R of the set/reset terminal-equipped D-type flip-flop 27E, the set/reset terminal-equipped D-type flip-flop 27E stores the high level signal Sig-1 as a flag. Since the set/reset terminal-equipped D-type flip-flop 27E stores the high level flag, the set/reset terminal-equipped D-type flip-flop 27E outputs a high level signal Sig-3 from the Q terminal to the second input terminal of the OR circuit 26.

As a result, when a user stops pressing the push switch SW, the signal Sig-4 output from the OR circuit 26 is maintained at a high level, and the signal Sig-5 output from the power supply control switch 22 is also maintained at a high level. Thus, the second power supply 24 maintains the output of the second voltage VE.

The following illustrates a case where the push switch SW is pressed by a user in order to shut down the image forming apparatus 1E when the image forming apparatus 1E is activated. When a user presses the push switch SW, the push switch SW outputs a high level signal Sig-SW to a GPIO 447. Upon receiving of the high level signal Sig-SW via the GPIO 447, the CPU 44 outputs the low level signal Sig-1, which is a second logic value, from the GPIO 448 to the data input terminal D of the set/reset terminal-equipped D-type flip-flop 27E.

Since the high level signal Sig-6 is input to the reset terminal R of the set/reset terminal-equipped D-type flip-flop 27E, the set/reset terminal-equipped D-type flip-flop 27E stores the low level signal Sig-1 as a flag. Since the set/reset terminal-equipped D-type flip-flop 27E stores the low level flag, the set/reset terminal-equipped D-type flip-flop 27E outputs a low level signal Sig-3 from the Q terminal to the second input terminal of the OR circuit 26.

When a user stops pressing the push switch SW, the signal Sig-4 output from the OR circuit 26 becomes a low level, and the signal Sig-5 output from the power supply control switch 22 becomes a low level. As a result, the second power supply 24 is powered off, and the output of the second voltage VE is stopped. When the output of the second voltage VE stops, the CPU 44 is stopped (powered off), and the image forming apparatus 1E shuts down.

Next, the following illustrates a case where a power failure occurs in the system power supply when the image forming apparatus 1E is activated. When the image forming apparatus 1E is activated, the set/reset terminal-equipped D-type flip-flop 27E stores a high level flag. When a power failure occurs in the system power supply while the image forming apparatus 1E is being activated, the first power supply 23 is powered off, and the output of the first voltage VX is stopped. When the output of the first voltage VX stops, the OR circuit 26 and the power supply control switch 22 are powered off, and the signal Sig-5 becomes a low level. As a result, the second power supply 24 is powered off, and the output of the second voltage VE is stopped.

Here, when the second voltage VE becomes lower than an operation threshold voltage of the reset circuit 5, the signal Sig-6 becomes a low level. Accordingly, when the low level signal Sig-6 is input to the reset terminal R (of the set/reset terminal-equipped D-type flip-flop 27E), the set/reset terminal-equipped D-type flip-flop 27E clears the flag to the low level, and outputs the low level signal Sig-3 from the Q terminal to the second input terminal of the OR circuit 26. Thus, the set/reset terminal-equipped D-type flip-flop 27E continues to store the low level flag using electric power output from the third power supply 25.

The following illustrates a case where the power failure of the system power supply has been restored thereafter. The set/reset terminal-equipped D-type flip-flop 27E outputs the low level signal Sig-3 to the second input terminal of the OR circuit 26 by using electric power output from the third power supply 25.

When the power failure of the system power supply is restored, and the first power supply 23 starts outputting the first voltage VX, the OR circuit 26 operates using electric power output from the first power supply 23. Since the signal Sig-3 is at a low level, the OR circuit 26 outputs a low level signal Sig-4 to the power supply control switch 22.

Since the signal Sig-4 is at a low level, the power supply control switch 22 outputs a low level signal Sig-5 to the second power supply 24. Since the signal Sig-5 is at a low level, the second power supply 24 is not activated. The CPU 44 will not thus start up.

That is, in a condition of the DIP switch 30 being set to the ON state, even if the power failure of the system power supply is restored, the image forming apparatus 1E will not start unless the user presses the push switch SW.

The image forming apparatus 1E according to the fifth embodiment exhibits the same advantages as those of the image forming apparatus 1B according to the third embodiment.

Further, the image forming apparatus 1E is enabled to determine, when power failure of the system power supply is restored, whether to start up without a user's pressing the push switch SW or not to start up unless the user presses the push switch SW, based on the ON state or the OFF state of the DIP switch 30.

Seventh Embodiment

In the image forming apparatus 1E according to the sixth embodiment, it is possible to determine, upon power failure of the system power supply being restored, whether to start up without a user's pressing the push switch SW or not to start up unless the user presses the push switch SW, based on the ON state or the OFF state of the DIP switch 30. However, it is not a user-friendly configuration for a user to set the DIP switch 30 ON or OFF state.

Figure 11:
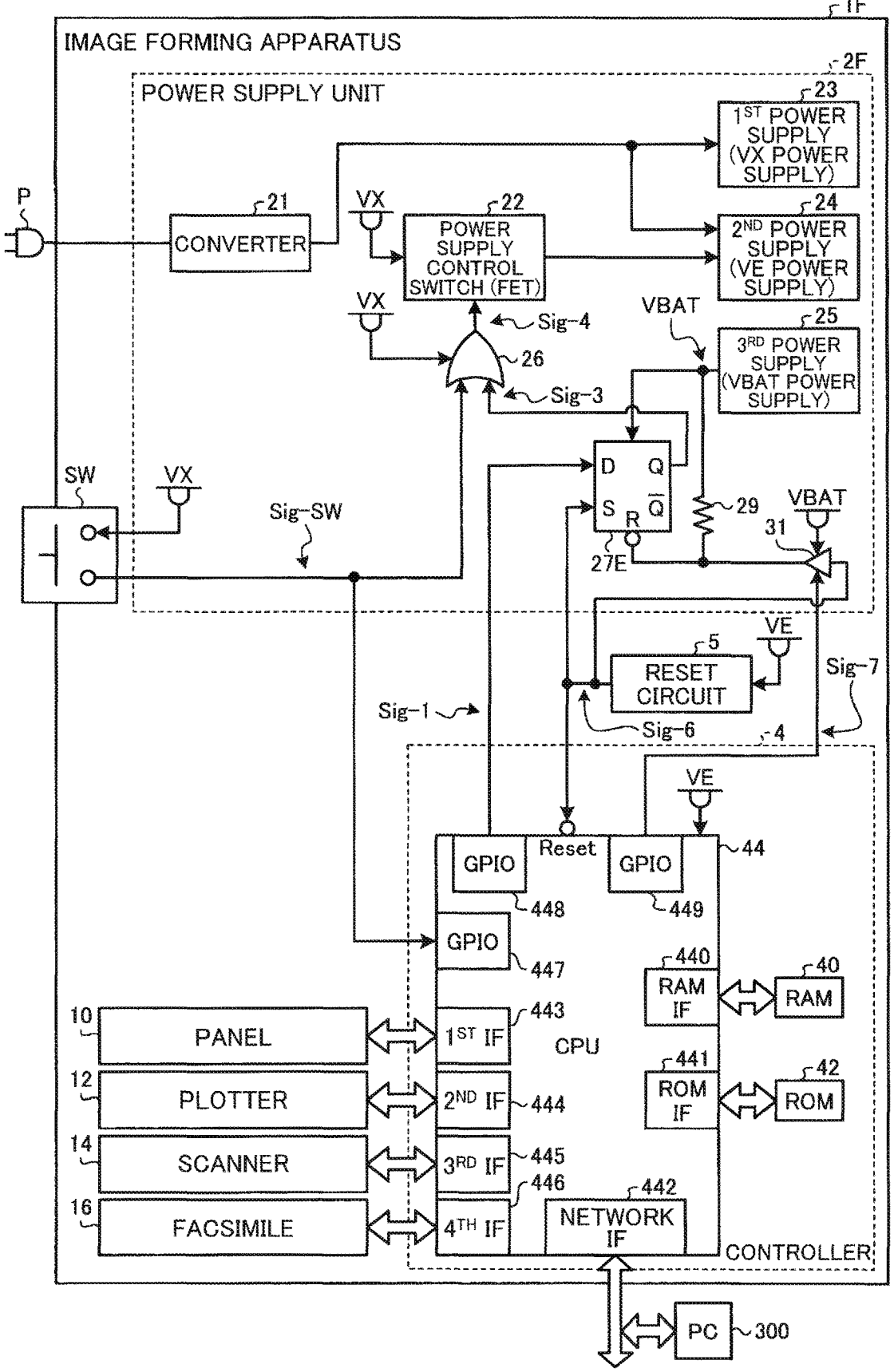
FIG. 11 is a block diagram illustrating a configuration of an image forming apparatus according to a seventh embodiment.

FIG. 11 is a block diagram illustrating a configuration of an image forming apparatus according to a seventh embodiment. Components that are the same as those of the first and the second comparative examples, and the first to the sixth embodiments already described are denoted by the same reference numerals, and description of those components is omitted.

As compared with the power supply unit 2E of the image forming apparatus 1E according to the sixth embodiment, a power supply unit 2F of an image forming apparatus 1F according to the seventh embodiment includes a 3-state buffer 31 instead of the DIP switch 30. The 3-state buffer 31 operates using electric power output from the third power supply 25.

When a signal Sig-7 output from the GPIO 449 of the CPU 44 is at a low level, the 3-state buffer 31 has high output impedance (Hi-Z). In this case, the reset terminal R of the set/reset terminal-equipped D-type flip-flop 27E is pulled up to the third voltage VBAT via the resistor 29.

That is, when the signal Sig-7 is at the low level, the operation of the image forming apparatus 1F is the same as the operation of the image forming apparatus 1E when the DIP switch 30 is set to the OFF state.

When the signal Sig-7 is at the high level, the 3-state buffer 31 outputs the signal Sig-6 output from the reset circuit 5 to the reset terminal R of the set/reset terminal-equipped D-type flip-flop 27E.

That is, when the signal Sig-7 is at the high level, the operation of the image forming apparatus 1F is the same as the operation of the image forming apparatus 1E when the DIP switch 30 is set to the ON state. The image forming apparatus 1F according to the seventh embodiment exhibits the same advantages as those of the image forming apparatus 1E according to the sixth embodiment.

Furthermore, the image forming apparatus 1F is enabled to switch the operation by software instead of the hardware of the DIP switch 30 when the power failure of the system power supply is restored. Thus, the image forming apparatus 1F is enabled to set the operation by the UI (User Interface) using the panel 10 or the like when the power failure of the system power supply is restored. Thus, it is possible to provide a user friendly setting configuration.

Eighth Embodiment

Figure 12:
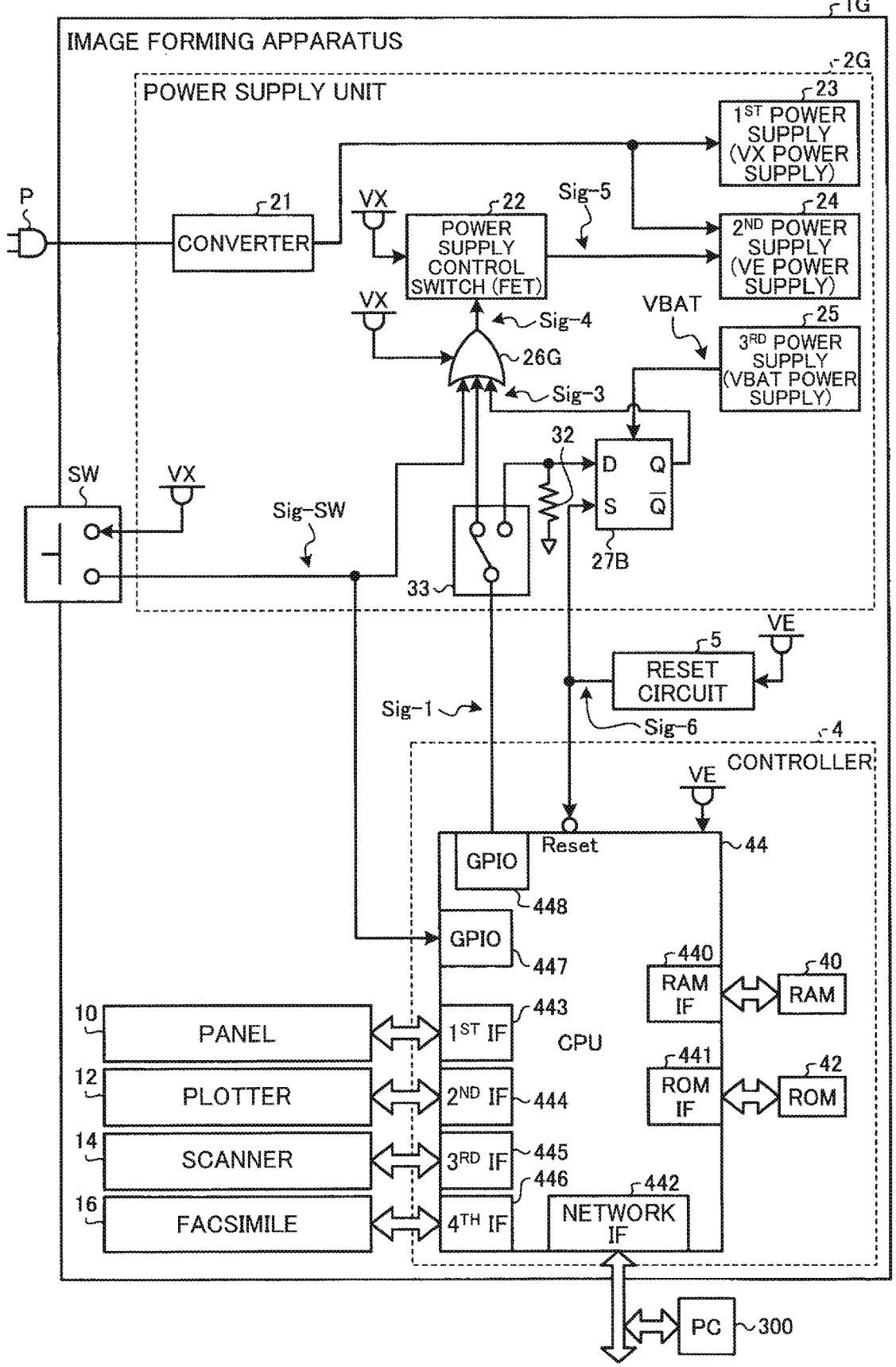
FIG. 12 is a block diagram illustrating a configuration of an image forming apparatus according to an eighth embodiment.

FIG. 12 is a block diagram illustrating a configuration of an image forming apparatus according to an eighth embodiment. Components that are the same as those of the first and the second comparative examples, and the first to the seventh embodiments already described are denoted by the same reference numerals, and description of those components is omitted.

As compared with the power supply unit 2B of the image forming apparatus 1B according to the third embodiment, a power supply unit 2G of an image forming apparatus 1G according to the eighth embodiment includes a three-input one-output OR circuit 26G instead of the two-input one-output OR circuit 26. Further, the power supply unit 2G includes a resistor 32 and a three-terminal mechanical switch 33. The mechanical switch 33 is exemplified by a DIP switch or a tab switch; however, the mechanical switch 33 is not limited to these examples.

The data input terminal D of the set terminal-equipped D-type flip-flop 27B is pulled down to a reference potential via the resistor 32. The reference potential is exemplified by the ground potential; however, the reference potential is not limited this example.

The mechanical switch 33 outputs the signal Sig-1 to the data input terminal D of the set terminal-equipped D-type flip-flop 27B or the third input terminal of the OR circuit 26G in accordance with the settings from a user.

When the mechanical switch 33 is set to output the signal Sig-1 to the data input terminal D of the set terminal-equipped D-type flip-flop 27B, the image forming apparatus 1G performs the same operation as the image forming apparatus 1B according to the third embodiment.

The following illustrates an operation of the image forming apparatus 1G when the mechanical switch 33 is configured to output the signal Sig-1 to the third input terminal of the OR circuit 26G.

The following illustrates a case where the push switch SW is pressed by a user in order to activate the image forming apparatus 1G. When a user presses the push switch SW, the push switch SW outputs a high level signal Sig-SW to the first input terminal of the OR circuit 26G. Upon receiving of the high level signal Sig-SW, the OR circuit 26G outputs a high level signal Sig-4 to the power supply control switch 22.

Upon receiving of the high level signal Sig-4, the power supply control switch 22 outputs a high level signal Sig-5 to the second power supply 24. Upon receiving of the high level signal Sig-5 input from the power supply control switch 22, the second power supply 24 outputs the second voltage VE to the reset circuit 5.

The reset circuit 5 starts up and operates using electric power output from the second power supply 24. The reset circuit 5 outputs a high level signal Sig-6 to a reset terminal Reset of the CPU 44 and also to the set terminal S of the set terminal-equipped D-type flip-flop 27B.

Since the high level signal Sig-6 is input to the set terminal S of the set terminal-equipped D-type flip-flop 27B, the set terminal-equipped D-type flip-flop 27B stores the pulled down low level signal as a flag. Since the set terminal-equipped D-type flip-flop 27B stores the low level flag, the set terminal-equipped D-type flip-flop 27B outputs a low level signal Sig-3 from the Q terminal to the second input terminal of the OR circuit 26G.

The CPU 44 is activated when the high level signal Sig-6 is input to the reset terminal Reset. Upon activation, the CPU 44 outputs a high level signal Sig-1 from a GPIO 448 to the third input terminal of the OR circuit 26G.

As a result, when a user stops pressing the push switch SW, the signal Sig-4 output from the OR circuit 26G is maintained at a high level, and the signal Sig-5 output from the power supply control switch 22 is also maintained at a high level. Thus, the second power supply 24 maintains the output of the second voltage VE.

The following illustrates a case where the push switch SW is pressed by a user in order to shut down the image forming apparatus 1G when the image forming apparatus 1G is activated. When a user presses the push switch SW, the push switch SW outputs a high level signal Sig-SW to a GPIO 447. Upon receiving of the high level signal Sig-SW via the GPIO 447, the CPU 44 outputs a low level signal Sig-1, which is a second logic value, from a GPIO 448 to the third input terminal of the OR circuit 26G.

Thus, when a user stops pressing the push switch SW, the signal Sig-4 output from the OR circuit 26G becomes a low level, and the signal Sig-5 output from the power supply control switch 22 becomes a low level. As a result, the second power supply 24 is powered off, and the output of the second voltage VE is stopped. When the output of the second voltage VE stops, the CPU 44 is stopped (powered off), and the image forming apparatus 1G shuts down.

Next, the following illustrates a case where a power failure occurs in the system power supply when the image forming apparatus 1G is activated. When a power failure occurs in the system power supply while the image forming apparatus 1G is being activated, the first power supply 23 is powered off, and the output of the first voltage VX is stopped. When the output of the first voltage VX stops, the OR circuit 26G and the power supply control switch 22 are powered off, and the signal Sig-5 becomes a low level. As a result, the second power supply 24 is powered off, and the output of the second voltage VE is stopped.

Here, when the second voltage VE becomes lower than an operation threshold voltage of the reset circuit 5, the signal Sig-6 becomes a low level. Accordingly, when the low level signal Sig-6 is input to the set terminal S (of the set terminal-equipped D-type flip-flop 27B), the set terminal-equipped D-type flip-flop 27B stores a signal at the timing when the signal Sig-6 changes from the high level to the low level; that is, the set terminal-equipped D-type flip-flop 27B stores a pulled down low level signal as a flag. Thus, the set terminal-equipped D-type flip-flop 27B continues to store the low level flag using electric power output from the third power supply 25. Thereafter, the CPU 44 stops, and the signal Sig-1 becomes a low level.

The following illustrates a case where the power failure of the system power supply has been restored thereafter. When the power failure of the system power supply is restored, and the first power supply 23 starts outputting the first voltage VX, the OR circuit 26G operates using electric power output from the first power supply 23. Since the signal Sig-SW, the signal Sig-1, and the signal Sig-3 are at the low level, the OR circuit 26G outputs the low level signal Sig-4 to the power supply control switch 22.

Since the signal Sig-4 is at a low level, the power supply control switch 22 outputs a low level signal Sig-5 to the second power supply 24. Since the signal Sig-5 is at a low level, the second power supply 24 is not activated.

That is, in a condition where the mechanical switch 33 is set such that the mechanical switch 33 outputs the signal Sig-1 to the third input terminal of the OR circuit 26G, even when the power failure of the system power supply is restored, the image forming apparatus 1G will not start unless a user presses the push switch SW.

The image forming apparatus 1G according to the eighth embodiment exhibits the same advantages as those of the image forming apparatus 1E according to the sixth embodiment.

Ninth Embodiment

Figure 13:
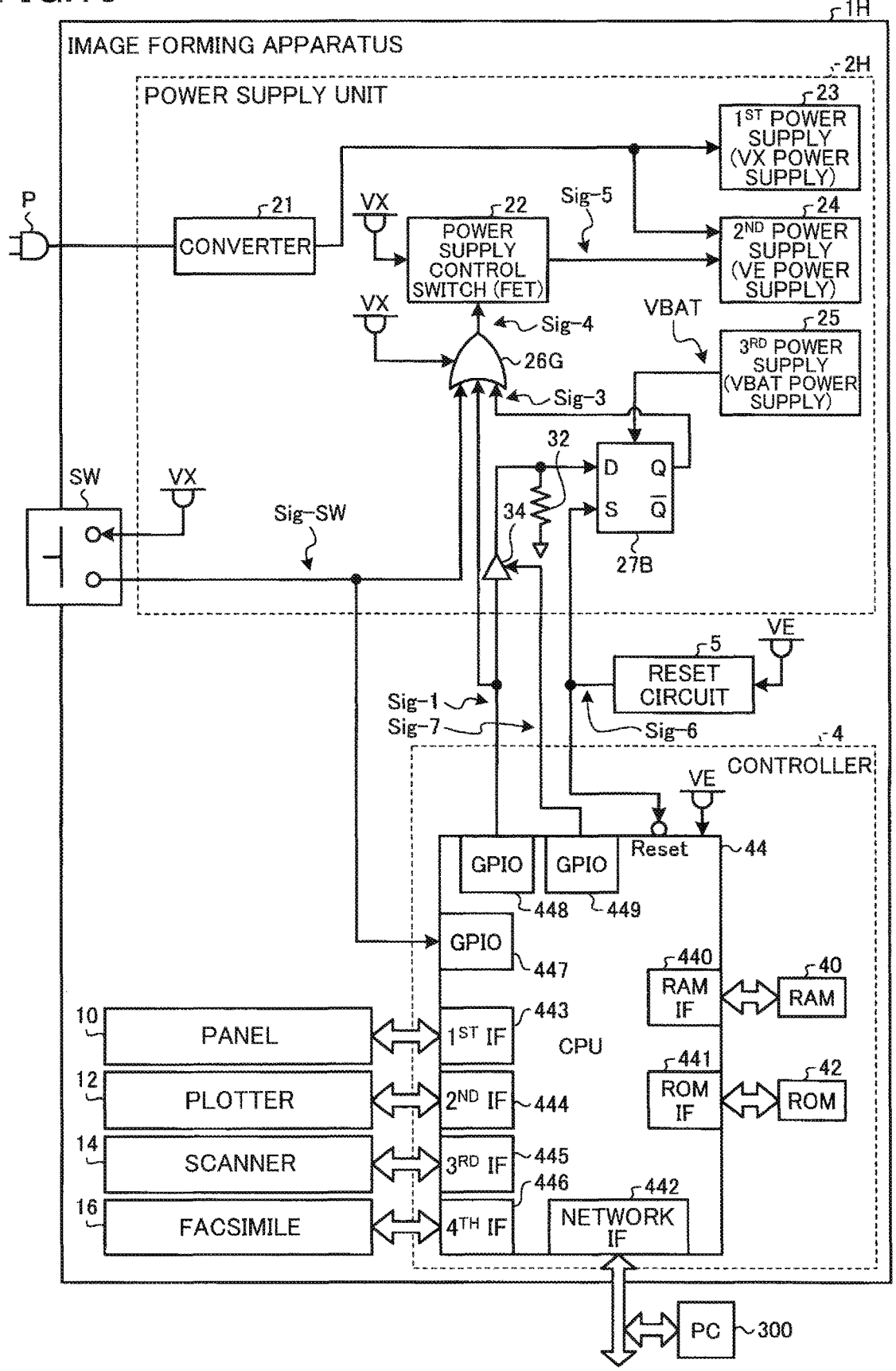
FIG. 13 is a block diagram illustrating a configuration of an image forming apparatus according to a seventh embodiment.

FIG. 13 is a block diagram illustrating a configuration of an image forming apparatus according to a ninth embodiment. Components that are the same as those of the first and the second comparative examples, and the first to the eighth embodiments already described are denoted by the same reference numerals, and description of those components is omitted.

As compared with the power supply unit 2G of the image forming apparatus 1G according to the eighth embodiment, a power supply unit 2H of an image forming apparatus 1F according to the ninth embodiment includes a 3-state buffer 34 instead of the mechanical switch 33.

When a signal Sig-7 output from the GPIO 449 of the CPU 44 is at a low level, the 3-state buffer 34 has high output impedance (Hi-Z). In this case, the data input terminal D of the set terminal-equipped D-type flip-flop 27B is pulled down to a reference potential via the resistor 32.

The operation of the image forming apparatus 1H when software of the CPU 44 is set such that the signal Sig-7 becomes a low level is the same as the operation of the image forming apparatus 1G when the mechanical switch 33 is set so as to output the signal Sig-1 to the third input terminal of the OR circuit 26G.

When the signal Sig-7 is at the high level, the 3-state buffer 34 outputs the signal Sig-1 to the data input terminal D of the set terminal-equipped D-type flip-flop 27B.

The signal Sig-1 is also input to the third input terminal of the OR circuit 26G.

The following illustrates an operation of the image forming apparatus 1H when the software of the CPU 44 is set such that the signal Sig-7 becomes a high level.

The following illustrates a case where the push switch SW is pressed by a user in order to activate the image forming apparatus 1H. When a user presses the push switch SW, the push switch SW outputs a high level signal Sig-SW to the first input terminal of the OR circuit 26G. Upon receiving of the high level signal Sig-SW, the OR circuit 26G outputs a high level signal Sig-4 to the power supply control switch 22.

Upon receiving of the high level signal Sig-4, the power supply control switch 22 outputs a high level signal Sig-5 to the second power supply 24. Upon receiving of the high level signal Sig-5 input from the power supply control switch 22, the second power supply 24 outputs the second voltage VE to the reset circuit 5.

The reset circuit 5 starts up and operates using electric power output from the second power supply 24. The reset circuit 5 outputs the high level signal Sig-6 to a reset terminal Reset of the CPU 44 and also to the set terminal S of the set terminal-equipped D-type flip-flop 27B.

The CPU 44 is activated when the high level signal Sig-6 is input to the reset terminal Reset. Upon activation, the CPU 44 outputs a high level signal Sig-1 from a GPIO 448 to the third input terminal of the OR circuit 26G. Upon activation, the CPU 44 outputs a high level signal Sig-7 to the 3-state buffer 34. Since the signal Sig-7 is at the high level, the 3-state buffer 34 outputs the signal Sig-1 to the data input terminal D of the set terminal-equipped D-type flip-flop 27B.

Since the high level signal Sig-6 is input to the set terminal S of the set terminal-equipped D-type flip-flop 27B, the set terminal-equipped D-type flip-flop 27B stores the high level signal Sig-1 as a flag. Since the set terminal-equipped D-type flip-flop 27B stores the high level flag, the set terminal-equipped D-type flip-flop 27B outputs a high level signal Sig-3 from the Q terminal to the second input terminal of the OR circuit 26G.

As a result, when a user stops pressing the push switch SW, the signal Sig-4 output from the OR circuit 26G is maintained at a high level, and the signal Sig-5 output from the power supply control switch 22 is also maintained at a high level. Thus, the second power supply 24 maintains the output of the second voltage VE.

The following illustrates a case where the push switch SW is pressed by a user in order to shut down the image forming apparatus 1H when the image forming apparatus 1H is activated. When a user presses the push switch SW, the push switch SW outputs a high level signal Sig-SW to a GPIO 447. Upon receiving of the high level signal Sig-SW via the GPIO 447, the CPU 44 outputs a low level signal Sig-1, which is a second logic value, to the third input terminal of the OR circuit 26G and to the 3-state buffer 34.

Since the high level signal Sig-6 is input to the set terminal S of the set terminal-equipped D-type flip-flop 27B, the set terminal-equipped D-type flip-flop 27B stores the low level signal Sig-1 as a flag. Since the set terminal-equipped D-type flip-flop 27B stores the low level flag, the set terminal-equipped D-type flip-flop 27B outputs a low level signal Sig-3 from the Q terminal to the second input terminal of the OR circuit 26G.

Thus, when a user stops pressing the push switch SW, the signal Sig-4 output from the OR circuit 26G becomes a low level, and the signal Sig-5 output from the power supply control switch 22 becomes a low level. As a result, the second power supply 24 is powered off, and the output of the second voltage VE is stopped. When the output of the second voltage VE stops, the CPU 44 is stopped (powered off), and the image forming apparatus 1H shuts down.

Next, the following illustrates a case where a power failure occurs in the system power supply when the image forming apparatus 1H is activated. When a power failure occurs in the system power supply while the image forming apparatus 1H is being activated, the first power supply 23 is powered off, and the output of the first voltage VX is stopped. When the output of the first voltage VX stops, the OR circuit 26G and the power control switch 22 are powered off, and the signal Sig-5 becomes a low level. As a result, the second power supply 24 is powered off, and the output of the second voltage VE is stopped.

Here, when the second voltage VE becomes lower than an operation threshold voltage of the reset circuit 5, the signal Sig-6 becomes a low level. Accordingly, when the low level signal Sig-6 is input to the set terminal S (of the set terminal-equipped D-type flip-flop 27B), the set terminal-equipped D-type flip-flop 27B stores a signal at the timing when the signal Sig-6 changes from the high level to the low level; that is, the set terminal-equipped D-type flip-flop 27B stores a high level signal Sig-1 as a flag. Thus, the set terminal-equipped D-type flip-flop 27B continues to store the high level flag using electric power output from the third power supply 25. Thereafter, the CPU 44 stops, and the signal Sig-1 becomes a low level.

The following illustrates a case where the power failure of the system power supply has been restored thereafter. When the power failure of the system power supply is restored, and the first power supply 23 starts outputting the first voltage VX, the OR circuit 26G operates using electric power output from the first power supply 23. Since the signal Sig-3 is at a high level, the OR circuit 26G outputs a high level signal Sig-4 to the power supply control switch 22.

Since the signal Sig-4 is at a high level, the power supply control switch 22 outputs a high level signal Sig-5 to the second power supply 24. Since the signal Sig-5 is at a high level, the second power supply 24 is activated and outputs second electric power VE to the CPU 44. The CPU 44 starts up and operates using electric power output from the second power supply 24.

That is, in a condition where the software of the CPU 44 is set such that the signal Sig-7 becomes a high level, the image forming apparatus 1H starts up without a user's pressing of the push switch SW when the power failure of the system power supply is restored.

The image forming apparatus 1H according to the ninth embodiment exhibits the same advantages as those of the image forming apparatus 1G according to the eighth embodiment.

Furthermore, the image forming apparatus 1H is enabled to switch the operation by software instead of the hardware of the mechanical switch 33 when the power failure of the system power supply is restored. Thus, the image forming apparatus 1H is enabled to set the operation by the UI (User Interface) using the panel 10 or the like when the power failure of the system power supply is restored. Thus, a user friendly setting configuration may be provided.

A program executed by the CPU 44 of the image forming apparatus according to each of the embodiments is provided by being stored in a file in an installable format or an executable format in a computer-readable recording medium such as a CD-ROM, a flexible disk (FD), a CD-R, and a DVD (Digital Versatile Disk).

In addition, a program executed by the CPU 44 of the image forming apparatus according to each of the embodiments may be stored on a computer connected to a network such as the Internet, and provided by being downloaded via the network. Further, a program executed by the CPU 44 of the image forming apparatus according to each of the embodiments may be provided or distributed via a network such as the Internet.

In addition, a program executed by the CPU 44 in each of the embodiments may be provided by being incorporated in advance in ROM or the like.

In the above-described embodiments, the present invention is applied to a multifunction peripheral having at least two functions of a copy function, a printer function, a scanner function, and a facsimile function as an example of the image forming apparatus; however, the present invention may be applied to any image forming apparatus such as a copying machine, a printer, a scanner apparatus, a facsimile apparatus, and the like.

Advantageous Effects of Invention

According to the embodiments, the flip-flop operates using electric power from a third power supply that outputs power by the battery. The flip-flop stores data of a first logic indicating value that an operation for activating an electronic apparatus has been performed or data of a second logic indicating value that an operation for shutting down an electronic apparatus has been performed. Accordingly, it is possible to provide an advantageous effect that when the flip-flop stores the data of the first logic value, the electronic apparatus is enabled to start up on the supposition that the system power supply has restored from the power failure.

The present invention is not limited to the specifically disclosed embodiments, and variations and modifications may be made without departing from the scope of the present invention.

What is claimed is:

1. A power supply device installed in an electronic apparatus, the power supply device comprising:
   a first power supply configured to output electric power upon a plug being connected to a system power supply;
   a second power supply configured to output electric power upon receiving of a power supply control signal;
   a third power supply configured to output electric power from a battery;
   a flip-flop configured to operate using at least the electric power output from the third power supply and configured to store first logic data indicating that an operation for activating the electronic apparatus has been performed or second logic data indicating that an operation for shutting down the electronic apparatus has been performed;
   a power supply control switch configured to operate using the electric power output from the first power supply, and to output the power supply control signal to the second power supply, in response to the operation for activating the electronic apparatus being performed or in response to the flip-flop storing the first logic data; and
   a controller configured to operate using the electric power output from the second power supply to control the electronic apparatus, and to, cause, upon the operation for activating the electronic apparatus being performed, the flip-flop to store the first logic data, and cause, upon the operation for shutting down the electronic apparatus being performed, the flip-flop to store the second logic data.

2. The power supply device according to claim 1, wherein the flip-flop is a D-type flip-flop, and the D-type flip-flop includes, a data terminal configured to receive the first logic data or the second logic data input from the controller, and a clock terminal configured to receive a signal indicating a timing of latching and storing the first logic data or the second logic data input from the controller.

3. The power supply device according to claim 1, wherein the flip-flop is a set terminal-equipped D-type flip-flop, and the set terminal-equipped D-type flip-flop includes, a data terminal configured to receive the first logic data or the second logic data input from the controller, and a set terminal configured to receive a signal indicating whether to latch and store data input to the data terminal or to continue to maintain currently stored data, wherein the set terminal receives a reset signal for resetting the controller or canceling the resetting of the controller.

4. The power supply device according to claim 1, wherein in response to the second power supply outputting electric power, the flip-flop operates using the electric power output from the second power supply.

5. The power supply device according to claim 1, wherein in response to the first power supply outputting electric power, the flip-flop operates using the electric power output from the first power supply.

6. The power supply device according to claim 1, wherein the flip-flop is a set/reset terminal-equipped D-type flip-flop, and the set/reset terminal-equipped D-type flip-flop includes, a data terminal configured to receive the first logic data or the second logic data input from the controller, a set terminal configured to receive a signal indicating whether to latch and store data input into the data terminal or to continue to maintain currently stored data, and a reset terminal configured to receive a first logic signal or a second logic signal indicating whether or not to clear a currently stored flag to the second logic data, wherein the set terminal receives a reset signal for resetting the controller or canceling the resetting of the controller, and the reset terminal is connected with a switch, the switch configured to switch whether the reset signal is input to the reset terminal or a first logic signal is input to the reset terminal.

7. The power supply device according to claim 1, wherein the flip-flop is a set/reset terminal-equipped D-type flip-flop, and the set/reset terminal-equipped D-type flip-flop includes, a data terminal configured to receive the first logic data or the second logic data input from the controller, a set terminal configured to receive a signal indicating whether to latch and store data input into the data terminal or to continue to maintain currently stored data, and a reset terminal configured to receive a first logic signal or a second logic signal indicating whether or not to clear a currently stored flag to the second logic data, wherein the set terminal receives a reset signal for resetting the controller or canceling the resetting, and the reset terminal is connected with a 3-state buffer, the 3-state buffer configured to select whether the reset signal or a first logic signal is input to the reset terminal in accordance with a control signal from the controller.

8. The power supply device according to claim 1, wherein the flip-flop is a set terminal-equipped D-type flip-flop, and the set terminal-equipped D-type flip-flop includes, a data terminal configured to receive the first logic data or the second logic data, and a set terminal configured to receive a signal indicating whether to latch and store data input to the data terminal or to continue to maintain currently stored data, wherein the data terminal is connected with a switch, the switch configured to switch whether one of the first logic data and the second logic data output from the controller is input to the data terminal or the second logic data is input to the data terminal, and wherein the set terminal receives a reset signal for resetting the controller or canceling the resetting of the controller.

9. The power supply device according to claim 1, wherein the flip-flop is a set terminal-equipped D-type and the set terminal-equipped D-type flip-flop includes, a data terminal configured to receive the first logic data or the second logic data, and a set terminal configured to receive a signal indicating whether to latch and store data input to the data terminal or to continue to maintain currently stored data, wherein the data terminal is connected with a 3-state buffer, the 3-state buffer configured to determine whether one of the first logic data and the second logic data output from the controller is input to the data terminal, or the second logic data is input to the data terminal in accordance with a control signal from the controller, and the set terminal receives a reset signal for resetting the controller or canceling the resetting of the controller.

10. The power supply device according to claim 1, wherein the flip-flop is configured to maintain operating using at least the electric power output from the battery irrespective of whether the electric power from the first power supply and the electric power from the second power supply is interrupted.

11. An image forming apparatus comprising:
the power supply device according to claim 1.

12. A method for controlling a power supply device installed in an electronic apparatus, the method comprising:

outputting, via a first power supply, electric power in response to a plug being connected to a system power supply;

outputting, via a second power supply, electric power in response to receipt of a power supply control signal;

outputting, via a third power supply, electric power from a battery;

causing, upon an operation for activating the electronic apparatus being performed, a flip-flop to store a first logic data using at least the electric power output from the third power supply, the first logic data indicating that the operation for activating the electronic apparatus has been performed;

causing, upon an operation for shutting down the electronic apparatus being performed, the flip-flop to store a second logic data selectively using the electric power output from the third power supply, the second logic data indicating that an operation for shutting down the electronic apparatus has been performed; and outputting, via a power supply control switch, the power supply control signal to the second power supply, in response to the operation for activating the electronic apparatus being performed or in response to the flip-flop storing the first logic data.

13. The method according to claim 12, further comprising:

causing, the flip-flop to store the first logic data or the second logic data using the electric power output from the second power supply, in response to the second power supply outputting the electric power.

14. The method according to claim 12, further comprising:

causing, the flip-flop to store the first logic data or the second logic data using the electric power output from the first power supply, in response to the first power supply outputting the electric power.

15. The method according to claim 12, wherein the electronic apparatus is an image forming apparatus.

16. The method according to claim 12, wherein the outputting, via the third power supply, the electric power from the battery maintains supplying the electric power from the battery to the flip-flop irrespective of whether the electric power from the first power supply and the electric power from the second power supply is interrupted.

* * * * *